(12) United States Patent
Welch

(10) Patent No.: US 10,730,444 B2
(45) Date of Patent: Aug. 4, 2020

(54) VEHICLE SEATING ARRANGEMENT HAVING STORAGE SOLUTIONS

(71) Applicant: Ford Global Technologies, LLC, Dearborn, MI (US)

(72) Inventor: Ryan Welch, Ottawa Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/886,347

(22) Filed: Feb. 1, 2018

(65) Prior Publication Data
US 2019/0232878 A1    Aug. 1, 2019

(51) Int. Cl.
| B60R 7/04 | (2006.01) |
| B60N 2/809 | (2018.01) |
| B60H 1/00 | (2006.01) |
| B60N 2/30 | (2006.01) |
| B60N 2/56 | (2006.01) |
| B60N 3/10 | (2006.01) |
| B60R 22/02 | (2006.01) |

(52) U.S. Cl.
CPC ......... B60R 7/043 (2013.01); B60H 1/00285 (2013.01); B60N 2/3011 (2013.01); B60N 2/3047 (2013.01); B60N 2/5628 (2013.01); B60N 2/809 (2018.02); B60N 3/101 (2013.01); B60R 2022/027 (2013.01)

(58) Field of Classification Search
CPC ... B60R 7/043; B60R 2022/027; B60N 2/809; B60N 2/3011; B60N 2/3047; B60N 2/5628; B60N 3/101; B60H 1/00285; B64D 11/06; B64D 11/0601

USPC ...................................................... 297/188.1
See application file for complete search history.

(56) References Cited

U.S. PATENT DOCUMENTS

| 4,382,628 | A | * | 5/1983 | Palmgren ............... B60N 2/242 |
| | | | | 244/118.6 |
| 5,720,514 | A | | 2/1998 | Carlsen et al. |
| 5,788,324 | A | | 8/1998 | Shea et al. |
| 5,816,650 | A | | 10/1998 | Lucas, Jr. |
| 6,024,411 | A | | 2/2000 | Pesta et al. |
| 6,036,252 | A | | 3/2000 | Hecksel et al. |
| 6,217,112 | B1 | | 4/2001 | Linsenmeier et al. |
| 6,247,751 | B1 | | 6/2001 | Faust et al. |
| 6,419,313 | B1 | | 7/2002 | Newman |
| 6,488,327 | B1 | | 12/2002 | Pearse et al. |
| 6,508,508 | B1 | | 1/2003 | Bargiel |
| 6,623,074 | B2 | | 9/2003 | Asbach et al. |
| 6,793,282 | B2 | * | 9/2004 | Plant ..................... B60N 3/002 |
| | | | | 297/248 |
| 6,877,807 | B2 | | 4/2005 | Mizuno et al. |
| 7,523,985 | B2 | | 4/2009 | Bhatia et al. |

(Continued)

FOREIGN PATENT DOCUMENTS

WO    0047442 A1    8/2000

*Primary Examiner* — Mark R Wendell
(74) *Attorney, Agent, or Firm* — David Coppiellie; Price Heneveld LLP

(57) ABSTRACT

A vehicle seating arrangement includes first and second seating assemblies that are each equipped with a seat and a seatback. A surface of the seat of the first seating assembly is vertically above a surface of the seat of the second seating assembly. A forward extreme of the first seating assembly is displaced rearward of a forward extreme of the second seating assembly.

19 Claims, 23 Drawing Sheets

(56) References Cited

U.S. PATENT DOCUMENTS

| | | | |
|---|---|---|---|
| 8,172,321 B2* | 5/2012 | Hankinson | B64D 11/00 |
| | | | 244/118.6 |
| 8,770,661 B2 | 7/2014 | Kalergis et al. | |
| 9,481,310 B2 | 11/2016 | Chawlk et al. | |
| 2007/0085363 A1 | 4/2007 | Sturt et al. | |
| 2009/0121523 A1 | 5/2009 | Johnson | |
| 2013/0038103 A1* | 2/2013 | Scott | B64D 11/06 |
| | | | 297/248 |
| 2015/0166181 A1* | 6/2015 | Scott | B64D 11/0601 |
| | | | 297/248 |
| 2018/0056882 A1* | 3/2018 | Osterhoff | B60N 2/682 |
| 2019/0099005 A1* | 4/2019 | Decker | A47C 17/213 |
| 2019/0106024 A1* | 4/2019 | Wellborn | B60N 2/753 |

\* cited by examiner

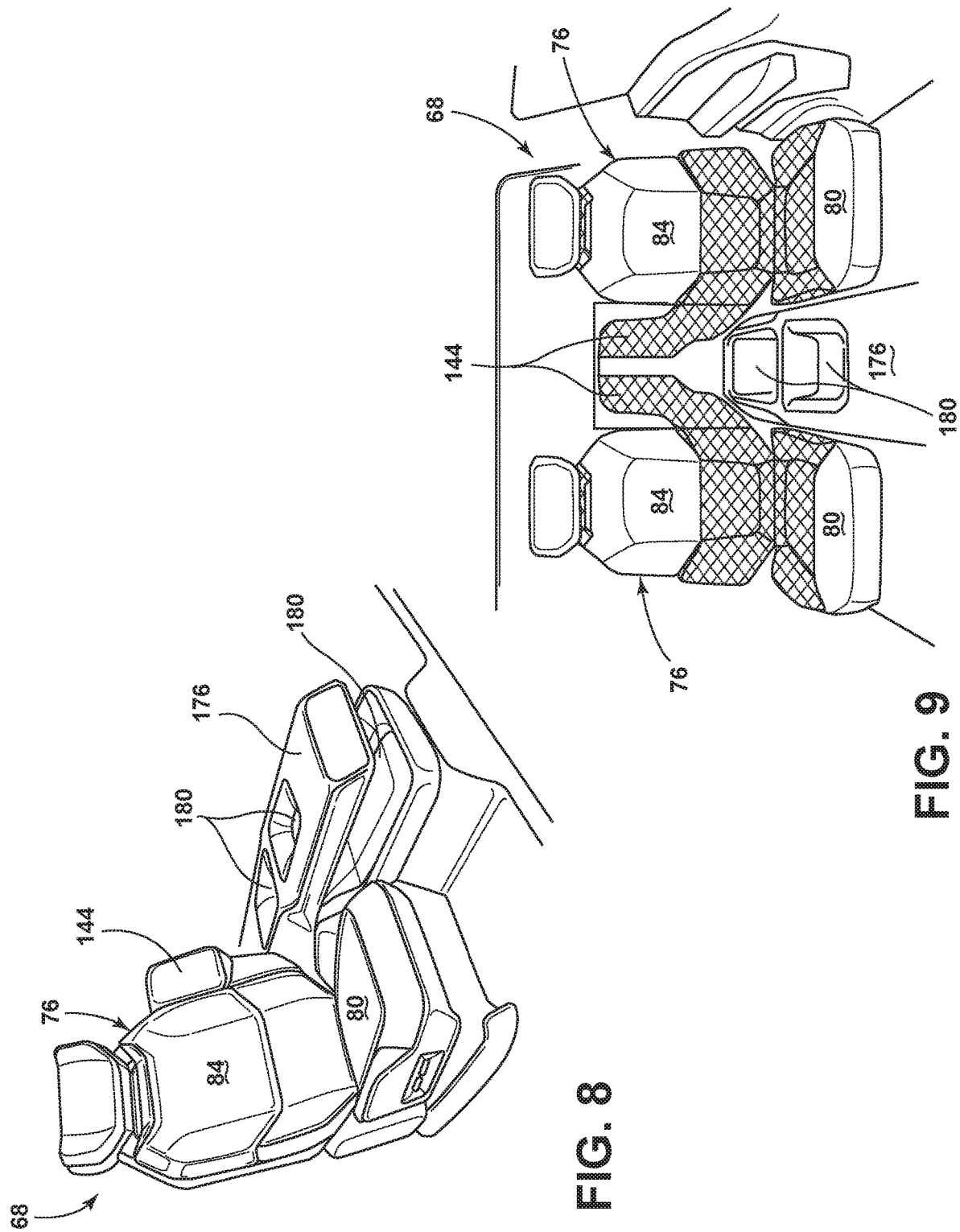

# VEHICLE SEATING ARRANGEMENT HAVING STORAGE SOLUTIONS

FIELD OF THE DISCLOSURE

The present disclosure generally relates to vehicle seating arrangements. More specifically, the present disclosure relates to vehicle seating arrangements having storage solutions.

BACKGROUND OF THE INVENTION

Vehicle seating arrangements often include a plurality of vehicle seating assemblies. These vehicle seating arrangements are sometimes provided with comfort or convenience features, such as, storage solutions, armrests, and bolsters. However, there is a need for new solutions to the needs of consumers that provide a more integrated and aesthetically pleasing appearance.

SUMMARY OF THE INVENTION

According to a first aspect of the present disclosure, a vehicle seating arrangement includes first and second seating assemblies that are each equipped with a seat and a seatback. A surface of the seat of the first seating assembly is vertically above a surface of the seat of the second seating assembly. A forward extreme of the first seating assembly is displaced rearward of a forward extreme of the second seating assembly.

Embodiments of the first aspect of the present disclosure can include any one or a combination of the following features:
  the first and second seating assemblies are adjacent to one another;
  the vehicle seating arrangement is continuous such that the entire vehicle seating arrangement moves as a single unit in fore and aft directions;
  a headrest of the first seating assembly is extendable and retractable in a vertical direction;
  the first seating assembly is equipped with a five-point harness;
  the first seating assembly is equipped with a retractable element that extends from the forward extreme of the first seating assembly;
  the vehicle seating arrangement is provided with HVAC plumbing that directs HVAC air reward of the vehicle seating arrangement from an upper of portion of a rearward side of the vehicle seating arrangement;
  the seat of the first seating assembly is extendable away from the seatback of the first seating assembly to reveal a storage bin;
  the seatback of the first and second seating assemblies is fixed relative to the seat such that a pitch angle of the seatback relative to the seat remains constant; and
  the first seating assembly includes at least three storage compartments that are independently accessible.

According to a second aspect of the present disclosure, the vehicle seating assembly includes a seat, a seatback, and at least three storage areas that are independently accessible. The seat is pivotably coupled to a support structure rearward of a forward extreme. The cup holders are operably coupled to an underside of the seat and provide support to the seat when the seat is in at least one of an extended position and a retracted position.

Embodiments of the second aspect of the present disclosure can include any one or a combination of the following features:
  the cup holders operably coupled to the underside of the seat provide support to the seat when the seat is in both the extended and the retracted positions;
  the at least three independently accessible storage areas include five storage areas;
  at least two of the storage areas are accessible by users positioned rearward of the vehicle seating assembly; and
  the at least three storage areas include a storage bin that is positioned directly below the seat when the seat is in the retracted position, wherein the storage bin is accessible when the seat is in the extended position and the seatback is in a forward-dumped position.

According to a third aspect of the present disclosure, a vehicle seating assembly includes a seat, a seatback, and one or more cushions that are removable from a component of the vehicle seating assembly and have a first side that is cushioned and a second side with at least one storage area. The cushions are transitioned from the first side to the second side by fully removing the cushions from a cavity and rotates the cushion one-hundred-eighty degrees, replacing the cushion in the cavity.

Embodiments of the third aspect of the present disclosure can include any one or a combination of the following features:
  a profile of the vehicle seating assembly remains the same regardless of whether the first or second sides are presented to a user;
  the component the cushions are removable from is at least one of a seat and a seatback;
  the cushions are positioned in both the seat and the seatback; and
  the at least one storage area includes at least one cup holder.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a side perspective view of an outboard seating assembly and a center console, according to one embodiment;

FIG. 9 is a front view of outboard seating assemblies and the center console, illustrating the armrests in a vertical position;

DETAILED DESCRIPTION OF THE PREFERRED EMBODIMENTS

Figure 1:
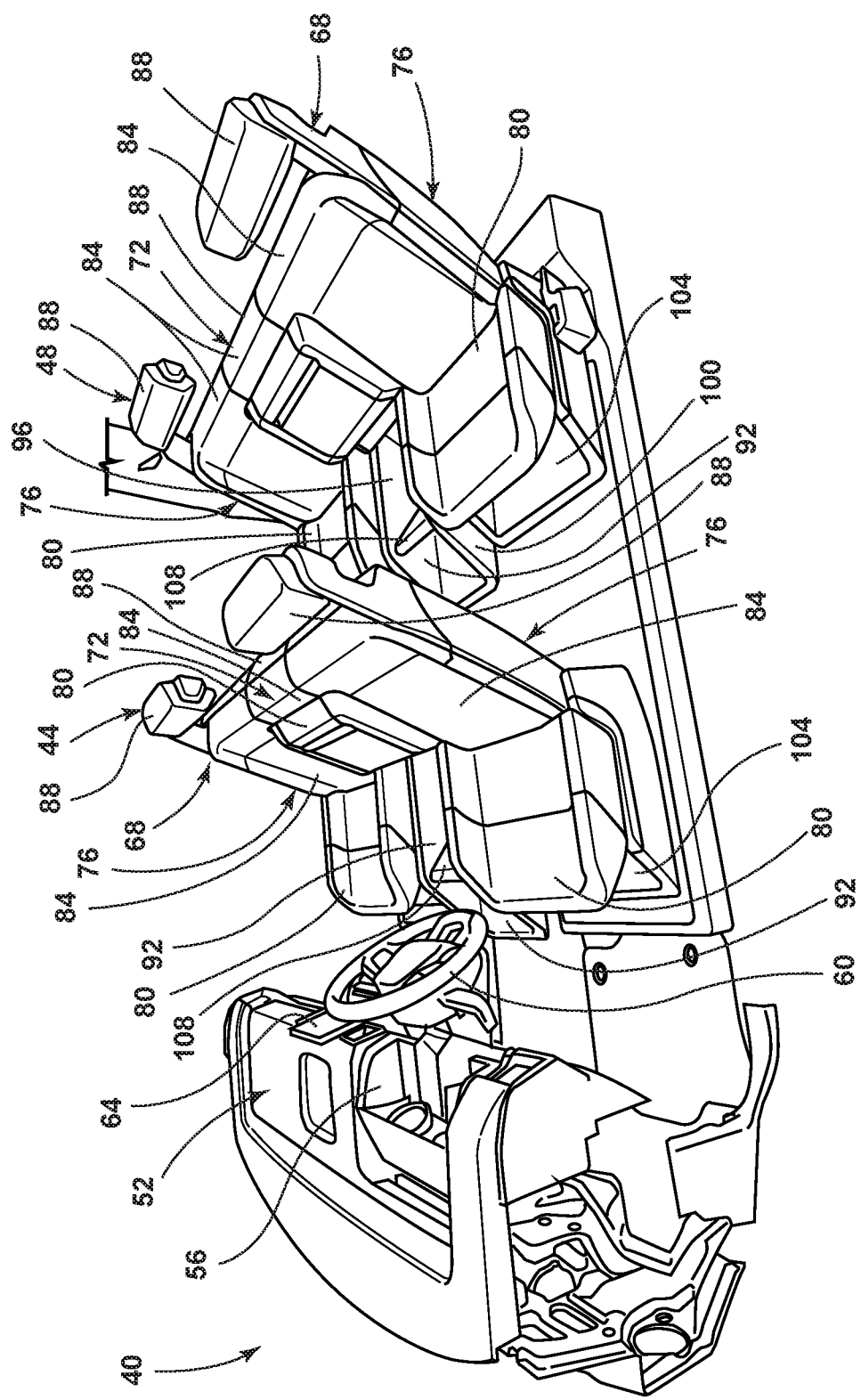
FIG. 1 is a side perspective view of a vehicle, illustrating vehicle seating arrangements, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating arrangement. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the teen "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 5:
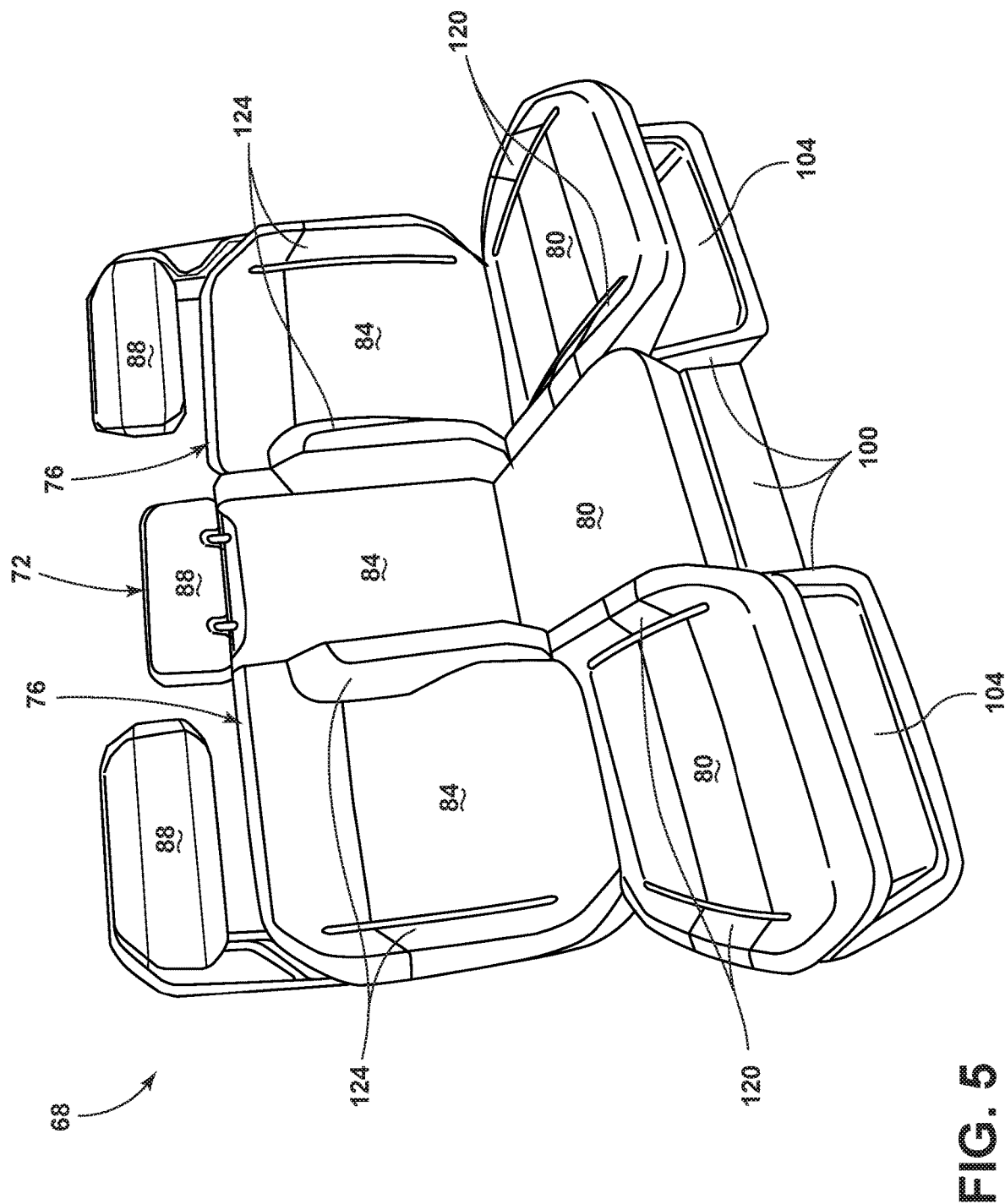
FIG. 5 is a front view of the vehicle seating arrangement according to another embodiment.

Referring to FIG. 1, a vehicle 40 includes a first row of seats 44 and a second row of seats 48. A dashboard assembly 52 is positioned in front of the first row of seats 44. The dashboard assembly 52 includes an instrument panel 56, a steering wheel 60, and an entertainment interface 64. The first and second row of seats 44, 48 include vehicle seating arrangements 68. The vehicle seating arrangements 68 include first, second, and third vehicle seating assemblies. The first vehicle seating assembly may be referred to as a center seating assembly 72. The second and third vehicle seating assemblies may be referred to as outboard seating assemblies 76. The center and outboard seating assemblies 72, 76 each include a seat 80 and a seatback 84. In various embodiments, the center and/or outboard seating assemblies 72, 76 include a headrest 88. In the depicted embodiment, the seat 80 of the center seating assembly 72 of the first and second rows of seats 44, 48 is in a stowed position. When the seat 80 of the center seating assembly 72 is in the stowed position, one or more storage areas 92 may be accessible. For example, a storage bin 96 may be positioned directly below the seat 80 of the center seating assembly 72 when the seat 80 is in a use position (FIG. 5). The storage bin 96 may be provided in a support structure 100 of the vehicle seating arrangement 68. The one or more storage areas 92 may further include a floor-level storage compartment 104. The floor-level storage compartment 104 may be positioned below and/or in front of the storage bin 96. The support structure 100 may include a cross-member 108 that can support a load on the seat 80 when the seat 80 is in the use position. The cross-member 108 may additionally serve as a front wall of the storage bin 96 and/or a rear wall of the floor-level storage compartment 104. The floor-level storage compartment 104 may be positioned below one or more of the center seating assembly 72 and the outboard seating assemblies 76. The center seating assembly 72 may include at least three storage compartments or storage areas 92 that are independently accessible.

Figure 2:
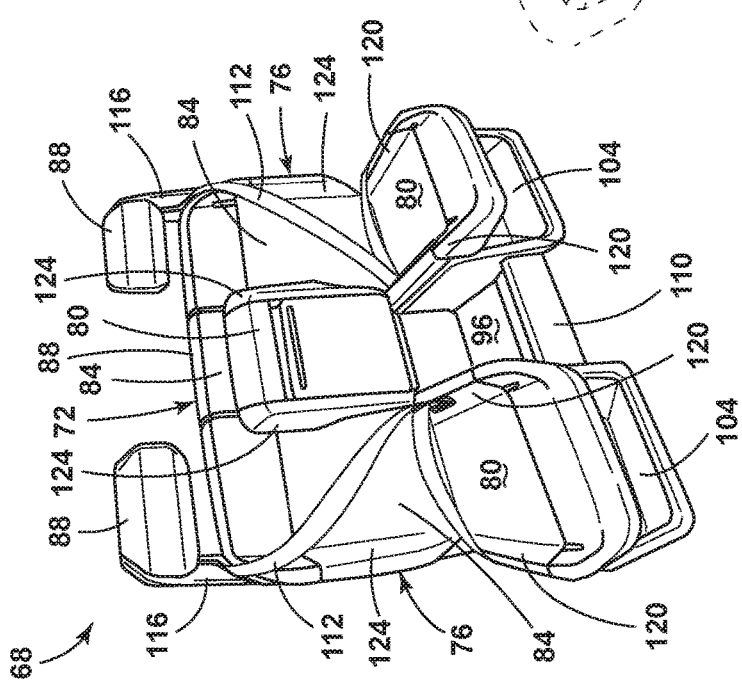
FIG. 2 is a front perspective view of the vehicle seating arrangement according to one embodiment, illustrating a seat of a center seating assembly in a stowed position.

Referring now to FIG. 2, the vehicle seating arrangement 68 is shown with the center seating assembly 72 (first seating assembly) and the outboard seating assemblies 76 (second and third seating assemblies). The outboard seating assemblies 76 flank either side of the center seating assembly 72. The seat 80 of the center seating assembly 72 is shown in the stowed position, which is accomplished by pivoting the seat 80 in an upward direction from the use position (FIG. 5) about an axis that is positioned at a vehicle rearward portion of the seat 80 that is proximal the seatback 84. With the seat 80 of the center seating assembly 72 in the stowed position, the storage bin 96 may be easily accessed by users seated in either of the outboard seating assemblies 76. The floor-level storage compartments 104 are also accessible independent of whether the seat 80 of any of the seating assemblies 72, 76 is in the use or stowed position. In some embodiments, such as the one depicted here, the storage bin 96 and the floor-level storage compartment 104 may be the same such that a single compartment exists rather than two independent compartments. The storage bin 96 may include a forward lip 110 that aids in retention of items stored in the storage bin 96. Safety restraints 112 may be retractably coupled to a headrest support post 116 that extends between the seatback 84 and the headrest 88. The outboard seating assemblies 76 are equipped with seat bolsters 120 and seatback bolsters 124 that flank the seat 80 and the seatback 84, respectively. The center seating assembly 72 may have separate seat bolsters 120 and seatback bolsters 124 from those provided on the outboard seating assemblies 76. Alternatively, the center seating assembly 72 may utilize the seat and seatback bolsters 120, 124 that are provided on the outboard seating assemblies 76.

Figure 3:
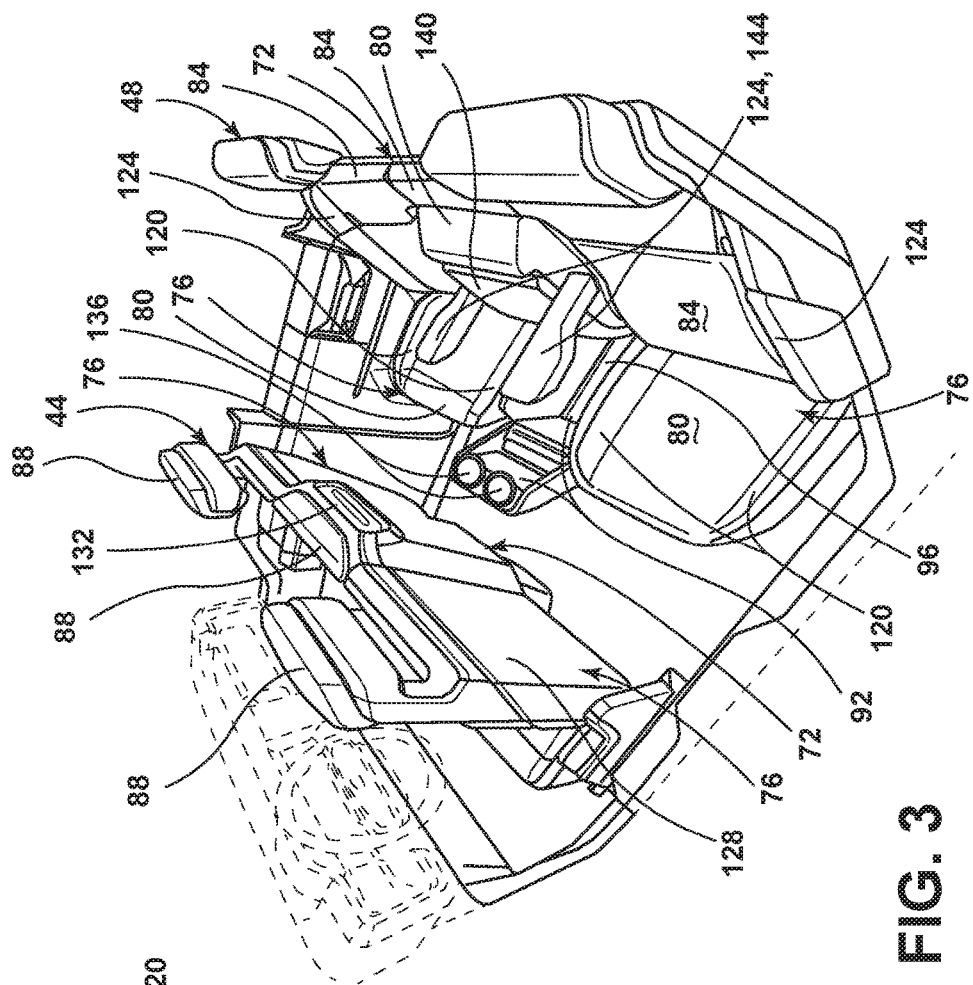
FIG. 3 is a rear perspective view of the vehicle seating arrangements, illustrating deployable armrests and storage areas, according to one embodiment.

Referring to FIG. 3, the headrest 88 on the center seating assembly 72 of the first row of seats 44 may be retractably coupled to the seatback 84 such that the headrest 88 may appear to be a part of the seatback 84 and that the seatback 84 is not equipped with the headrest 88. By so coupling the headrest 88 to the center seating assembly 72, a continuous and aesthetically pleasing surface between the outboard seating assemblies 76 may be presented to a user. Additionally, hindering the view of a driver or generally increasing blind spots is avoided by so coupling the headrest 88 to the seatback 84 until such a time as the center seating assembly 72 becomes occupied, at which point the headrest 88 may be deployed for safety and comfort reasons. The center seating assembly 72 in the second row of seats 48 may be similarly configured. A rearward side 128 of the center seating assembly 72 in the first row of seats 44 may be equipped with a control panel 132. The control panel 132 may provide rearward passengers the ability to control a variety of functions that may include, but are not limited to, heating ventilation and air conditioning (HVAC) controls, audio controls, mobile device connectivity, entertainment features, and/or comfort settings for the seating assemblies 72, 76. Additionally or alternatively, air vents may be positioned in an upper region of the rearward side 128 of the first row of seats 44 such that the rearward passengers are provided with heated or cooled air at face-level rather than at floor-level. Accordingly, the comfort of rearward passengers may be improved overall.

Referring again to FIG. 3, the center seating assembly 72 in the second row of seats 48 is shown with the seat 80 in the stowed position. One of the storage areas 92 is shown in an extended position where one or more cup holders 136 have been made accessible by the storage area 92 being placed in the extended position. When the seat 80 is in the extended position, one or more cup holders 136 may be accessible. Additionally, the storage bin 96 has been made fully accessible by placing the seat 80 in the stowed position and the storage area 92 in the extended position. An underside of the seat 80 may further include a fold-out element 140 that is configured to independently fold down from the seat 80 when the seat 80 is in the stowed position to provide additional functionality to the user(s) seated in either or both of the outboard seating assemblies 76. The additional functionality provided by the fold-out element 140 may include, but is not limited to, media storage, media connectivity, a work surface, additional beverage holders, divided storage compartments, and/or combinations thereof. The seat bolsters 120 and/or the seatback bolsters 124 may be deployable for use as armrests 144. For example, the seat bolsters 120 may be deployable when the seat 80 of the center seating assembly 72 is in the stowed position, as shown in FIG. 3. Accordingly, the center seating assembly 72 may be equipped with seat bolsters 120 that are independent from the seat bolsters 120 of the outboard seating assemblies 76. Alternatively, the seat bolsters 120 of the outboard seating assemblies 76 may travel with the seat 80 of the center seating assembly 72 when the seat 80 is placed in the stowed position. Accordingly, it is contemplated that a decreased seat bolster may remain with the seats 80 of the outboard seating assemblies 76 when the center seating assembly 72 is in the stowed position. Alternatively, the entirety of the seat bolster 120 for the outboard seating assemblies 76 may travel with the seat 80 of the center seating assembly 72 such that lateral support on an inboard side of the outboard seating assemblies 76 may be provided solely by the armrests 144 when the armrests 144 are in a deployed position. In various examples, the action of deploying (i.e., deployment of) the armrests 144 and/or the deployed position of the armrests 144 may be configured such that a seating capacity of the vehicle 40 (FIG. 1) is not decreased.

Figure 4:
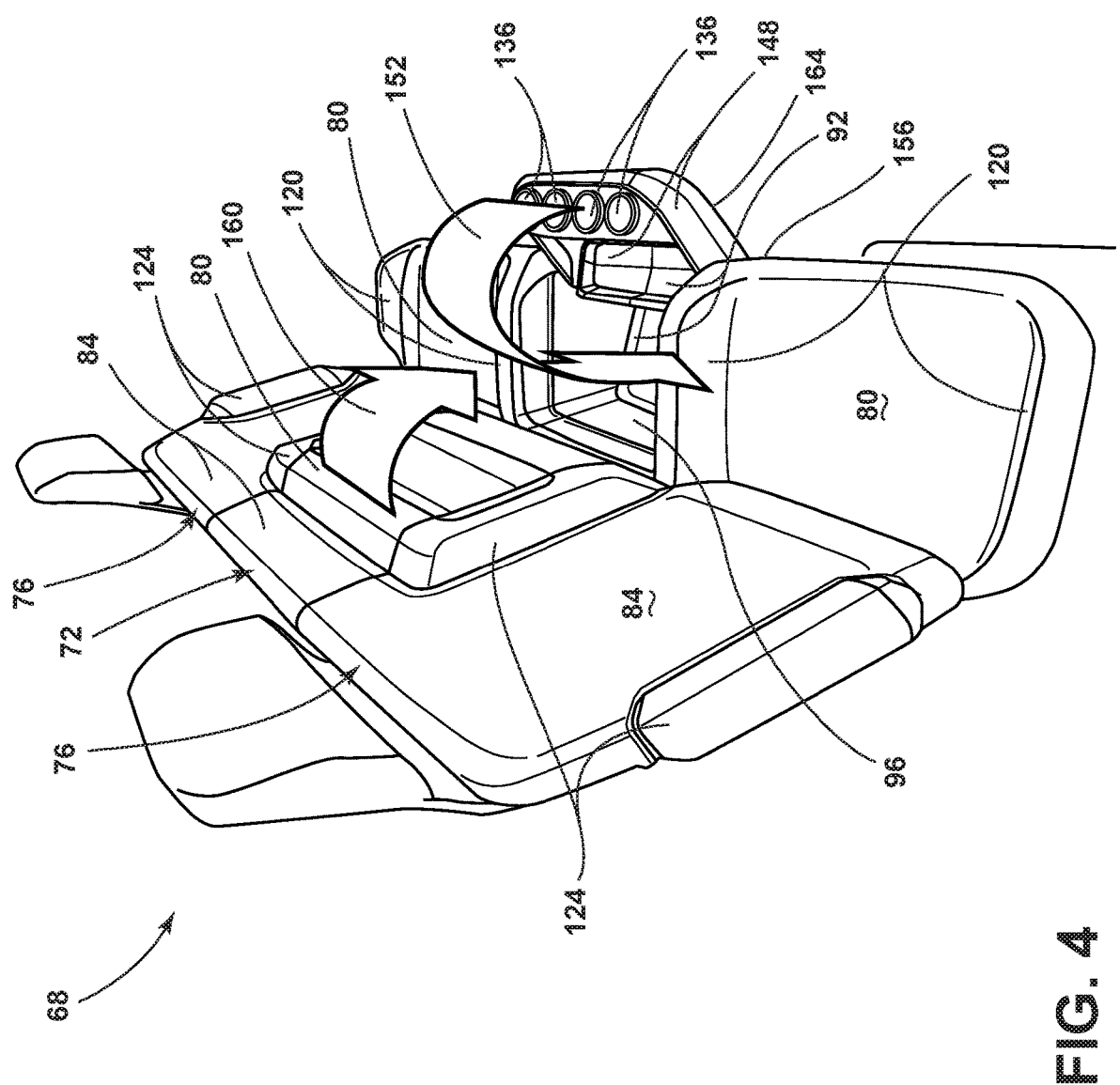
FIG. 4 is a side perspective view of the vehicle seating arrangement, illustrating a transition from the stowed position to a use position of the center seating assembly.

Referring now to FIG. 4, the vehicle seating arrangement 68 is shown with the seat 80 of the center seating assembly 72 in the stowed position and with one of the storage areas 92 in the extended position. The storage area 92 is equipped with the one or more cup holders 136 and a generally horizontal surface that may be used, for example, as a media storage area 148. In some examples, the media storage area 148 is a recessed storage compartment rather than a generally horizontal surface. The storage bin 96 is fully accessible to an occupant of either of the outboard seating assemblies 76 when the center seating assembly 72 is positioned as shown. In the depicted embodiment, the inboard and/or outboard seat bolsters 120 and/or seatback bolsters 124 may be deployable for use as armrests 144 (FIG. 3). For example, the inboard and outboard seatback bolsters 124 on the outboard seating assemblies 76 may be deployable from a generally vertical position, as shown in FIG. 4, to a generally horizontal position for use as armrests 144. Returning the center seating assembly 72 to the use position (FIG. 5) may be accomplished by a first movement 152 of the storage area 92 about a rotational axis that is proximal a forward extreme 156 of the center seating assembly 72 in a rearward direction toward the seatback 84. A second movement 160 pivots the seat 80 of the center seating assembly 72 in a downward direction about the pivot axis that is proximal the seatback 84 such that the seat 80 of the center seating assembly 72 is at least partially supported by the storage area 92. The seat 80 may be pivotably coupled to the support structure 100 rearward of the forward extreme 156. The storage area 92 may provide an upper extreme to the storage bin 96 when the storage area 92 is in the stowed position. Additionally or alternatively, when the storage area 92 is in the stowed position and the seat 80 of the center seating assembly 72 is in the stowed position, various storage solutions may be presented to occupants of the outboard seating assembly 76 that are molded into or generally provided in an upper surface 164 of the storage area 92 when the storage area 92 is in the stowed position.

Referring to FIG. 5, the center seating assembly 72 is shown in the use position. An alternative embodiment of the headrest 88 of the center seating assembly 72 is also shown. This alternative headrest 88 may be extendably coupled to the seatback 84 or may be rotatably coupled to the seatback 84 along an upper edge of the seatback 84. The floor-level storage compartments 104 can be seen below the outboard seating assemblies 76. In general, the floor-level storage compartments 104 and the storage bin 96 (FIG. 4) may be formed in the support structure 100 that is located below the seats 80 of the vehicle seating arrangement 68. The seats 80 on the outboard seating assemblies 76 may also be capable of assuming the stowed position of the center seating assembly 72, wherein the seats 80 pivot about a pivot axis that is proximal the seatback 84 such that the storage bin 96 and the floor-level storage compartments 104 become accessible to a user. Said another way, the vehicle seating arrangement 68 may be a stadium-style seating arrangement where the stowed position of the seat 80 presents the user with various storage solutions that are formed in the support structure 100 rather than presenting the user with a flat continuous floor of the vehicle 40 (FIG. 1). In the depicted embodiment, the seat bolsters 120 and/or the seatback bolsters 124 may be deployable as armrests 144 (FIG. 3).

Figure 6:
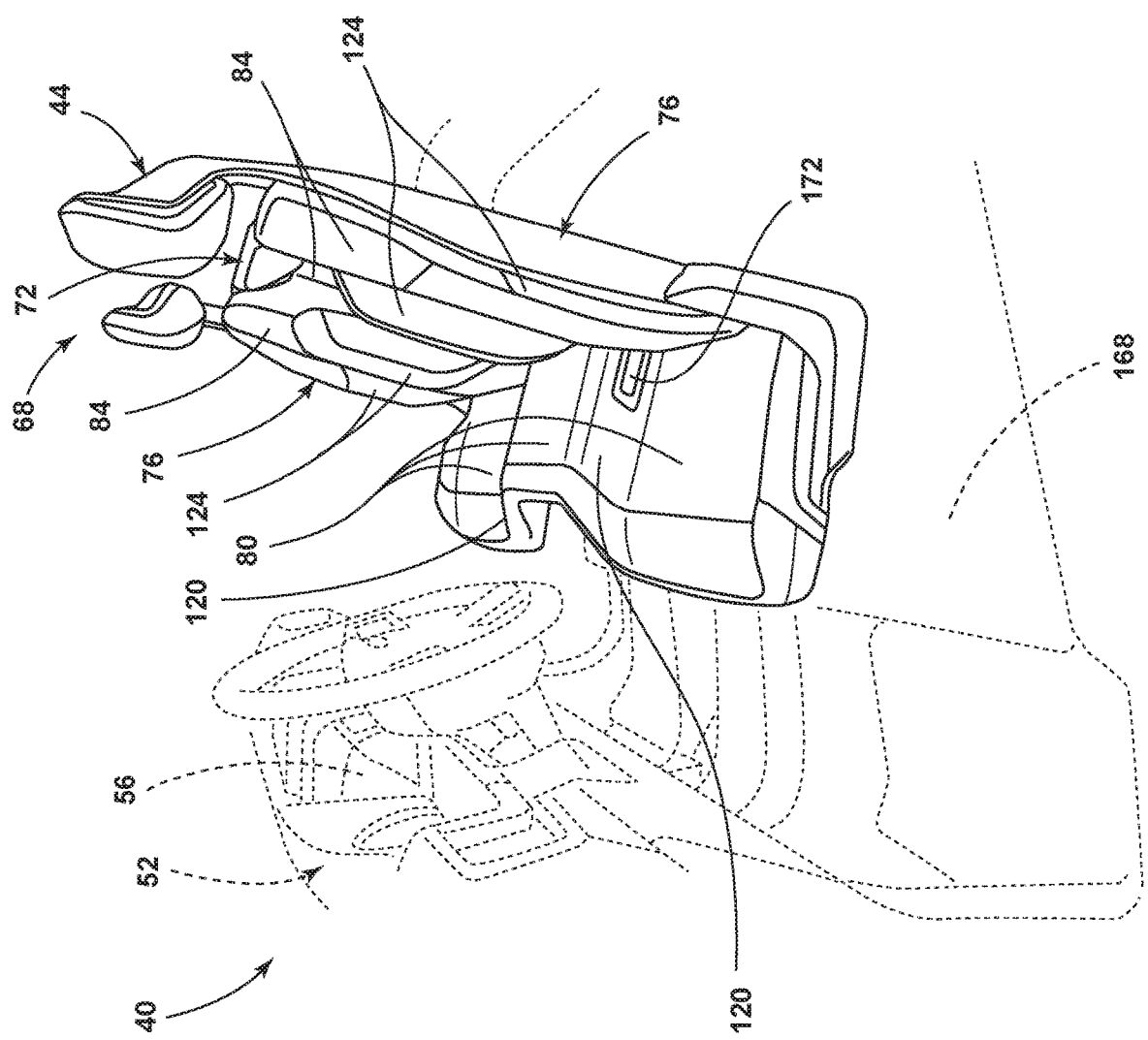
FIG. 6 is a side view of the vehicle seating arrangement, according to one embodiment.
Figure 7:
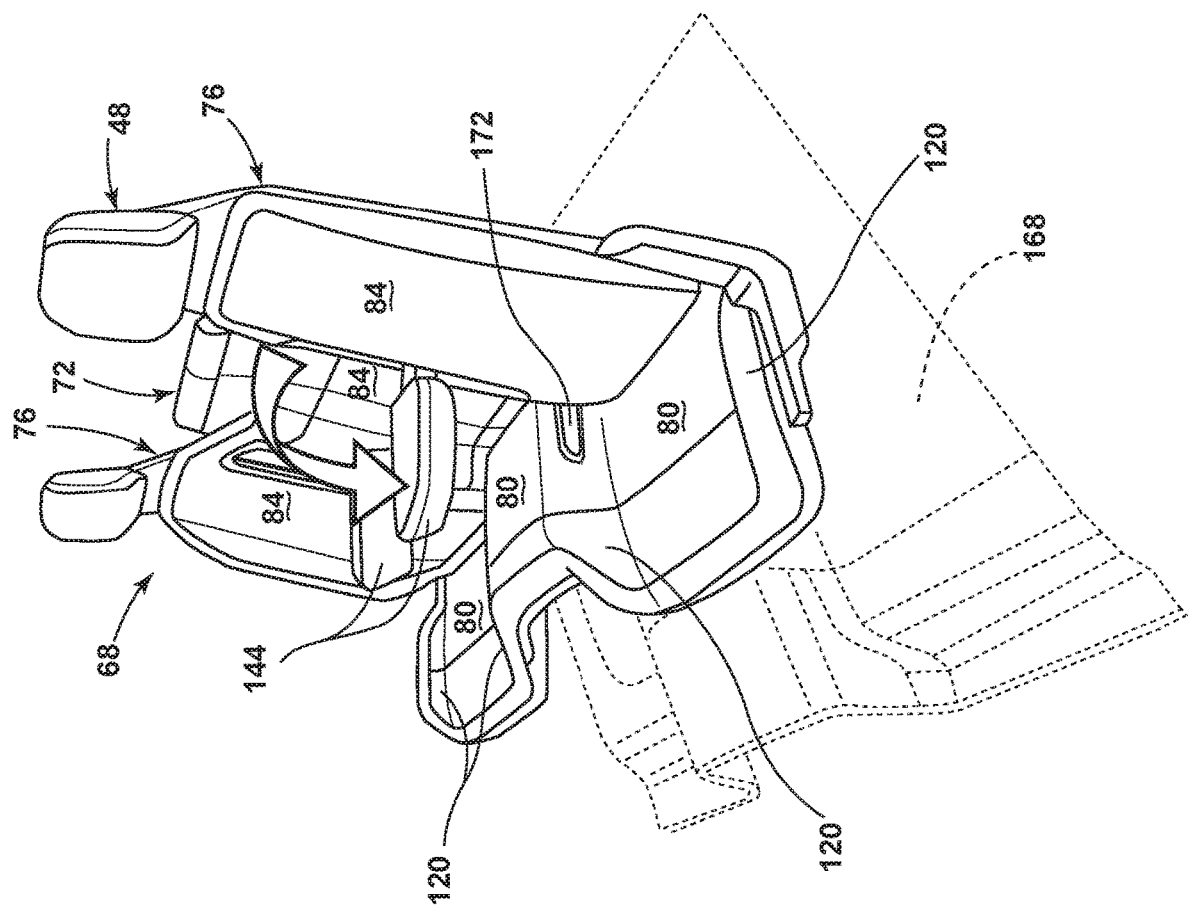
FIG. 7 is a side perspective view of the vehicle seating arrangement, illustrating the armrests in a deployed position.

Referring now to FIGS. 6 and 7, a profile or contour of the vehicle seating arrangement 68 may generally correspond with a floor 168 of the vehicle 40. The center seating assembly 72 may have the seat 80 vertically displaced in an upward direction relative to the seat 80 of the outboard seating assemblies 76. The seatback 84 of the center seating assembly 72 may be longitudinally displaced rearward relative to the seatback 84 of the outboard seating assemblies 76. Said another way, an H-point of the center seating assembly 72 may be displaced vertically upward and longitudinally rearward of the H-point for the outboard seating assemblies 76. The H-point is the location of the occupant's hip, when seated in a vehicle seating assembly (e.g., the center seating assembly 72), relative to the floor 168 of the vehicle (or to the height above the pavement level). The H-point, as generally defined by the Society of Automotive Engineers (SAE), is a mechanically hinged hip point of a three-dimensional manikin (SAE J2826 manikin), which simulates the actual pivot center of a human hip. The H-point can be thought of, roughly, as the hip joint of a 50th percentile male occupant, viewed laterally. Additionally, the H-point location is unique to each vehicle and many design criteria related to various vehicle aspects such as safety, interior packaging, visibility, and seating are based off of the H-point location. With the center seating assembly 72 sitting vertically higher than, and longitudinally more rearward than, the outboard seating assembly 76, a driver of the vehicle 40 may have an easier time viewing out a side window of the vehicle when the center seating assembly 72 is occupied. In general, the contours of the vehicle seating arrangement 68 may generally correspond with the instrument panel 56 of the dashboard assembly 52. Additionally, by so positioning the center seating assembly 72 an occupant of the center seating assembly 72 may be provided with greater leg room than if the vehicle seating arrangement 68 was configured as a traditional bench seat where the various seating positions form a generally continuous L-shape. The seat bolsters 120 may include bolster apertures 172. The bolster apertures 172 may be utilized as HVAC outlets to provide heated and/or cooled air to the occupants of the outboard seating assemblies 76. Additionally or alternatively, the bolster apertures 172 may permit access to a latch system for a child's car seat.

Referring again to FIGS. 6 and 7, while depicted as the first row of seats 44 in FIG. 6, it is contemplated that the vehicle seating arrangement 68 may similarly apply to the second row of seats 48, see FIG. 7. In FIG. 7, the seatback bolsters 124 on the inboard side of the outboard seating assembly 76 are shown in a deployed position for use as the armrests 144. Deployment of the armrests 144 may be accomplished with pivotable movement of the seatback bolsters 124 from the generally vertical stowed position to the generally horizontal use position depicted here. In some examples, the armrests 144 may be deployed with pivotal and vertical motion of the seatback bolster 124. The pivotal and vertical motion may happen simultaneously or sequentially. For example, in the depicted embodiment of FIG. 7, rotational actuation of the seatback bolster 124 from the stowed position by a user may simultaneously activate vertical motion of the seatback bolster 124. Alternatively, the seatback bolster 124 may be actuated as the armrest 144 in a pivotable direction and then vertically actuated to a preferred height by the user.

Referring now to FIGS. 8 and 9, in some examples, the vehicle seating arrangement 68 may include two outboard seating assemblies 76 that are separated by a center console 176. The center console 176 may include one or more storage compartments 180. The outboard seating assemblies 76 may include armrests 144 on an inboard side of the seatback 84. The armrests 144 may be rotatably coupled to the seatback 84 such that the armrest 144 may travel through a rotational angle of up to about 180 degrees. Accordingly, the armrest 144 may be utilized by an occupant of the outboard seating assembly 76 when the armrest 144 is rotated about 90 degrees forward for use by the occupant of the outboard seating assembly 76. In some examples, the armrest 144 may be rotated about 90 degrees rearward of the outboard seating assemblies 76 such that a rearward passenger may utilize the armrest 144 as a storage surface to place objects on. The armrest 144 may include one or more storage solutions, such as cup holders, storage bins, mobile device storage compartments, and/or combinations thereof. It is contemplated that the one or more storage solutions may be provided on a top surface and/or a bottom surface of the armrest 144 such that the storage solutions may be utilized when the armrest 144 is rotated about 90 degrees forward and/or rearward.

Figure 10:
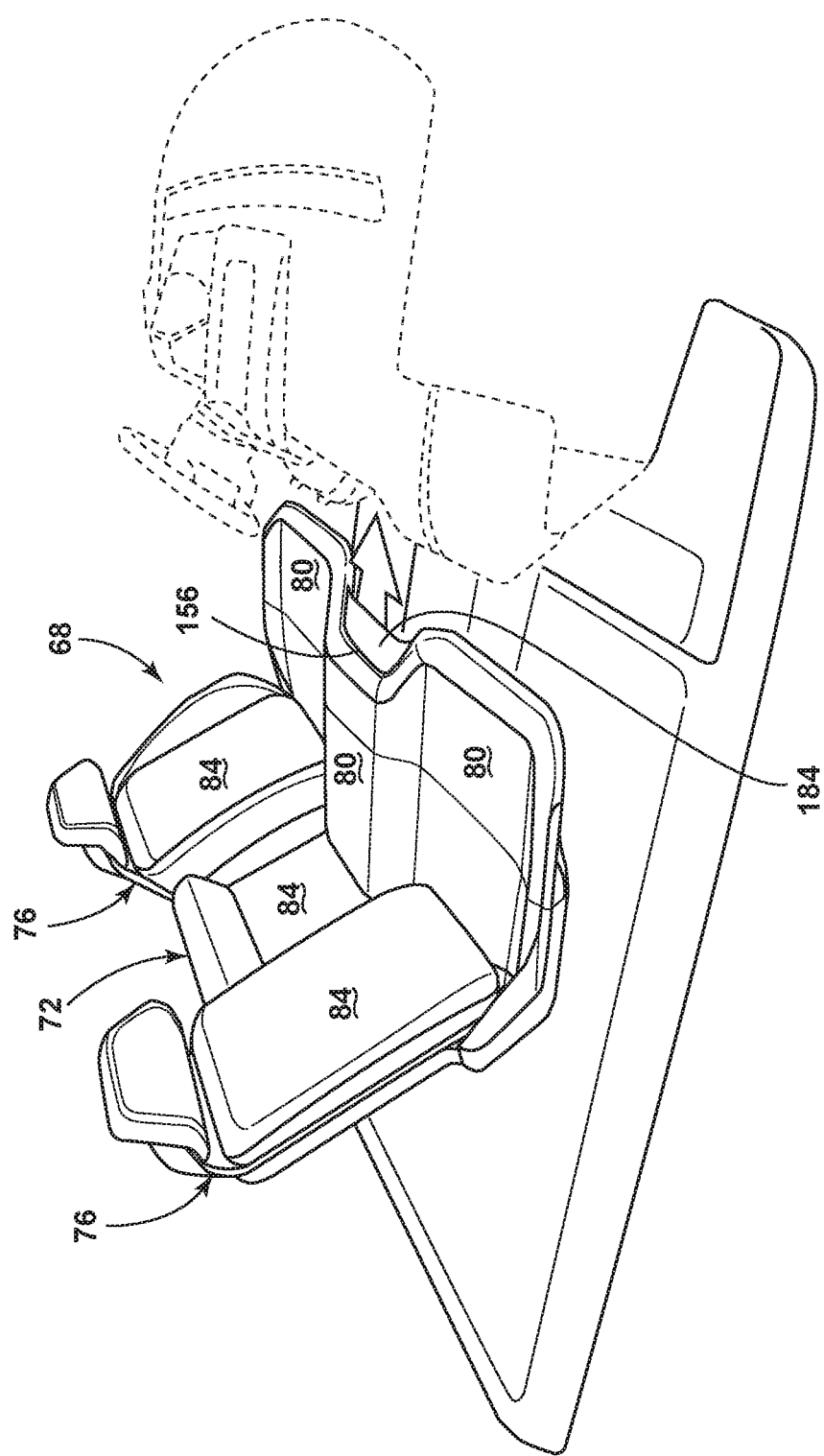
FIG. 10 is a side perspective view of the vehicle seating arrangement, illustrating a retractable element.

Referring to FIG. 10, the vehicle seating arrangement 68 is depicted as the first row of seats 44 and having additional functionality that is coupled to an underside of the seat 80 of the center seating assembly 72. The additional functionality may be referred to as a retractable element 184. The retractable element 184 may extend from the forward extreme 156 of the center seating assembly 72. The retractable element 184 may be equipped with a deployable cup holder, device holder, work surface, thigh support extension, general storage solution, and/or combinations thereof. The retractable element 184 may be a substantially continuous surface that includes one or more of the cup holder, device holder, work surface, thigh support extension, and general storage solution.

Figure 11:
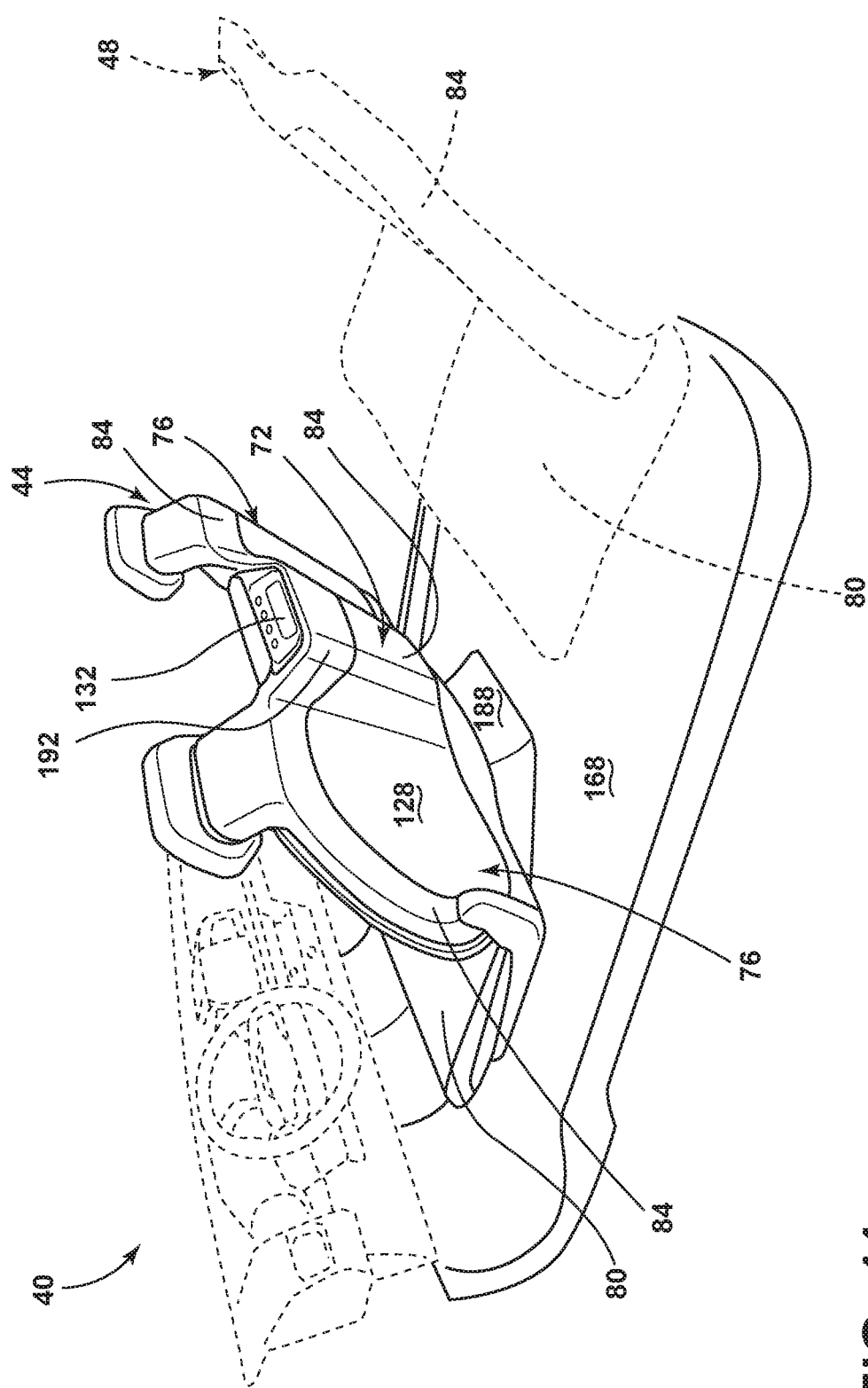
FIG. 11 is a rear perspective view of a first row of seats, illustrating a control panel on a rearward side of the first row of seats.

Referring to FIG. 11, the first row of seats 44 may be supported on a central platform 188 that is positioned below the center seating assembly 72. The central platform 188 may allow items to be stored longitudinally along the floor 168 of the vehicle 40. The central platform 188 may be located entirely below the center seating assembly 72. Alternatively, the central platform 188 may at least partially extend to an area below the outboard seating assemblies 76. The first row of seats 44, which is one of the vehicle seating arrangements 68, may move as a single unit and may be slidably coupled to the central platform 188 such that the entire first row of seats 44 moves longitudinally in the fore and aft directions. In some examples, the seatbacks 84 of the vehicle seating arrangement 68 may move as a single unit such that inclining and/or reclining of one of the center seating assembly 72 or the outboard seating assemblies 76 may induce inclining and/or reclining of the remaining seating assemblies. In alternative examples, the seatbacks 84 of the vehicle seating arrangement 68 may be fixed relative to the seat 80 such that a pitch angle of the seatback 84 relative to the seat 80 remains constant. The rearward side 128 of the first row of seats 44 may be equipped with the control panel 132 that is positioned on the rearward side of the center seating assembly 72 in an upper portion 192 thereof. The vehicle seating arrangement 68 may be provided with HVAC plumbing that directs conditioned air (e.g., heated or cooled) rearward of the vehicle seating arrangement 68 from the upper portion 192 of the rearward side 128 of the vehicle seating arrangement 68. The control panel 132 may allow passengers seated in the second row of seats 48 to control various functionalities related to the user experience. For example, the control panel 132 may be utilized to adjust comfort settings, HVAC, settings, media connectivity, audio output, general comfort settings, general entertainment settings, and/or combinations thereof.

Figure 12:
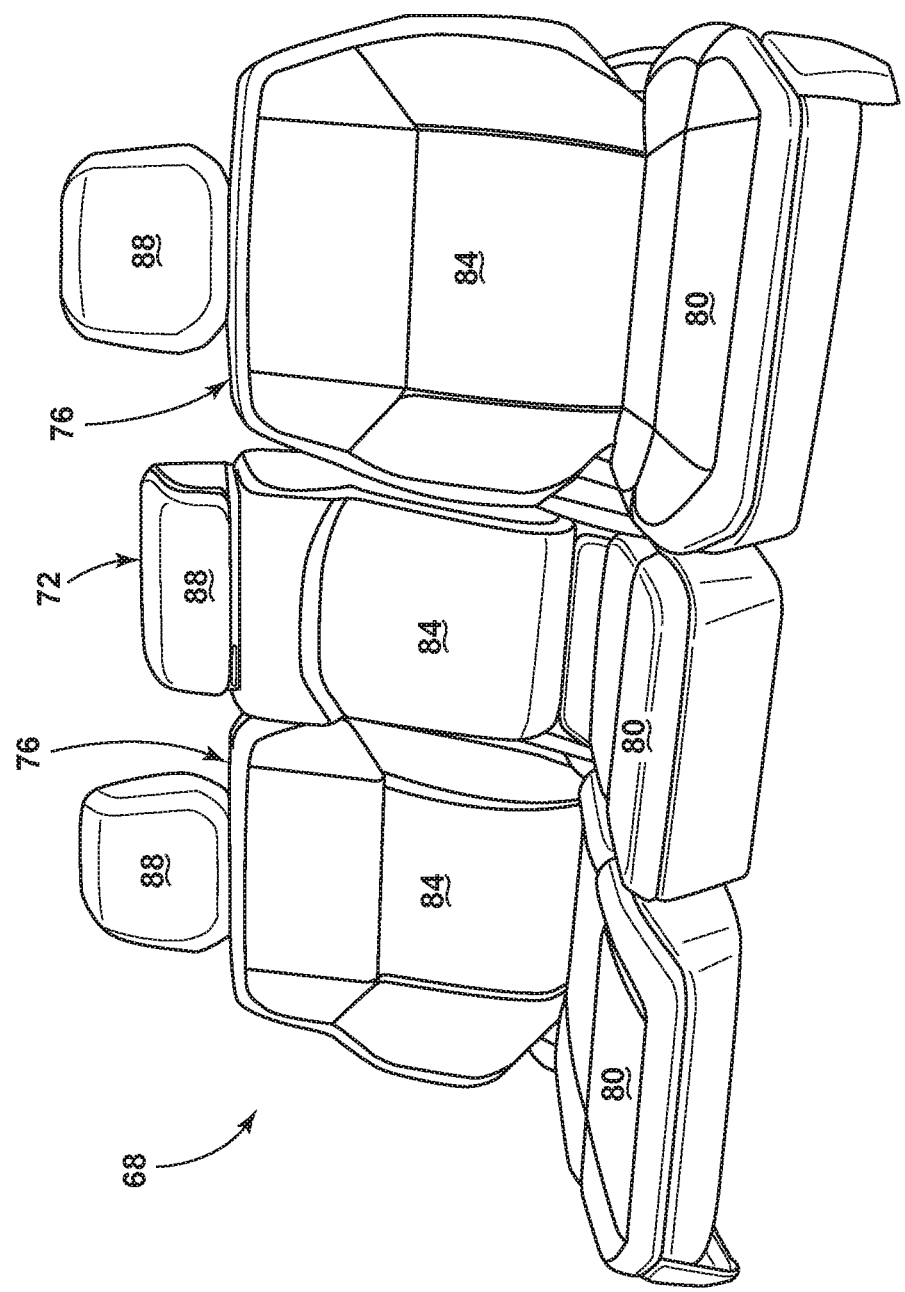
FIG. 12 is a front perspective view of the vehicle seating arrangement in the use position, according to one embodiment.
Figure 13:
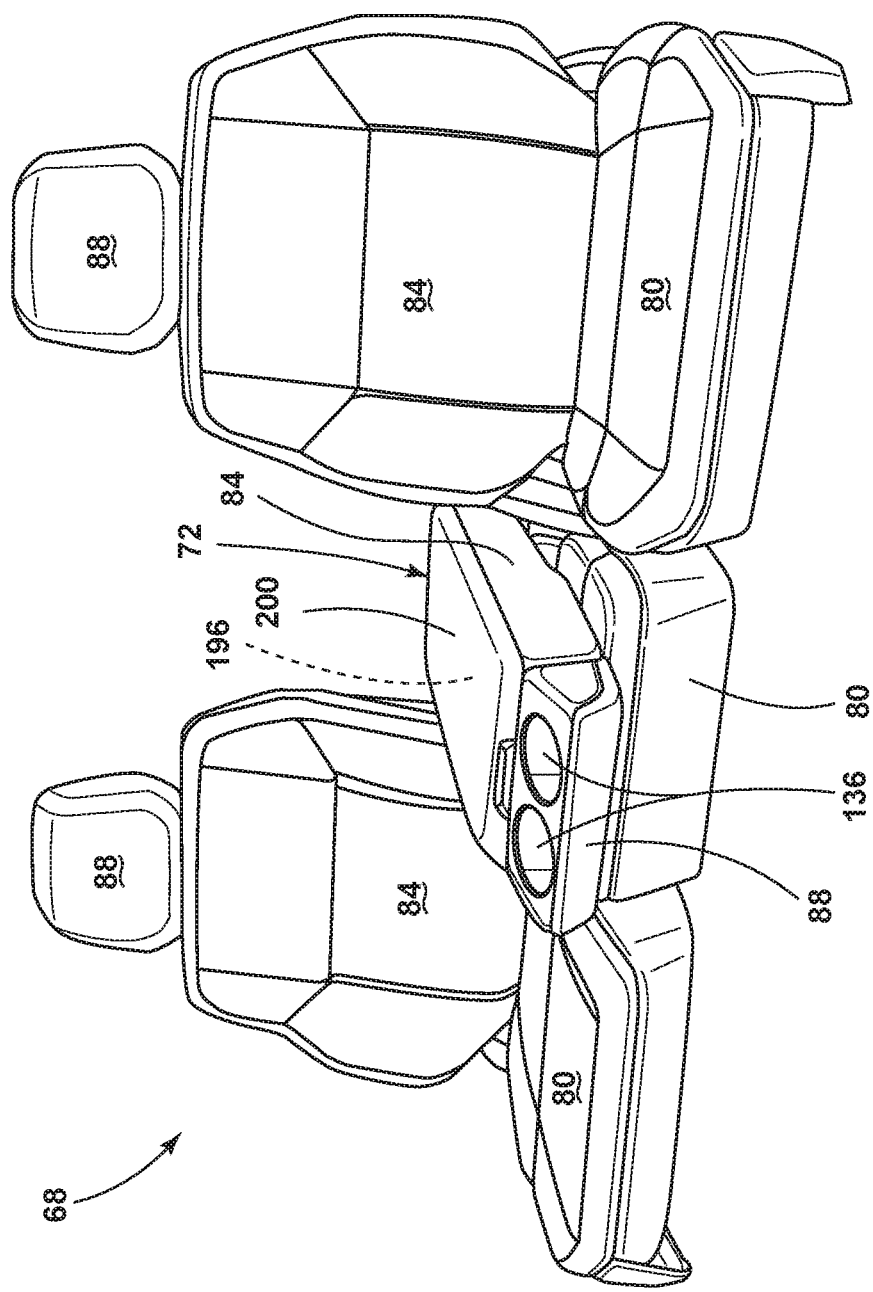
FIG. 13 is a front perspective view of the vehicle seating arrangement, illustrating the center seating assembly in a forward-dumped position.

Referring now to FIGS. 12 and 13, an alternative embodiment of the vehicle seating arrangement 68 depicts the center seating assembly 72 having the seat 80 and the seatback 84 vertically and longitudinally aligned with the seat 80 and the seatback 84 of the outboard seating assemblies 76. The headrest 88 on the center seating assembly 72 is coupled to the seatback 84 at an upper portion of the seatback 84. When the seatback 84 of the center seating assembly 72 is placed in a forward-dumped position (FIG. 13), the one or more cup holders 136 may become accessible to occupants of the outboard seating assembly 76. The cup holders 136 are positioned in a rearward side of the headrest 88. A seatback storage area 196 is located on a rearward side of the seatback 84 and may be accessible through actuation of a seatback storage lid 200.

Figure 14:
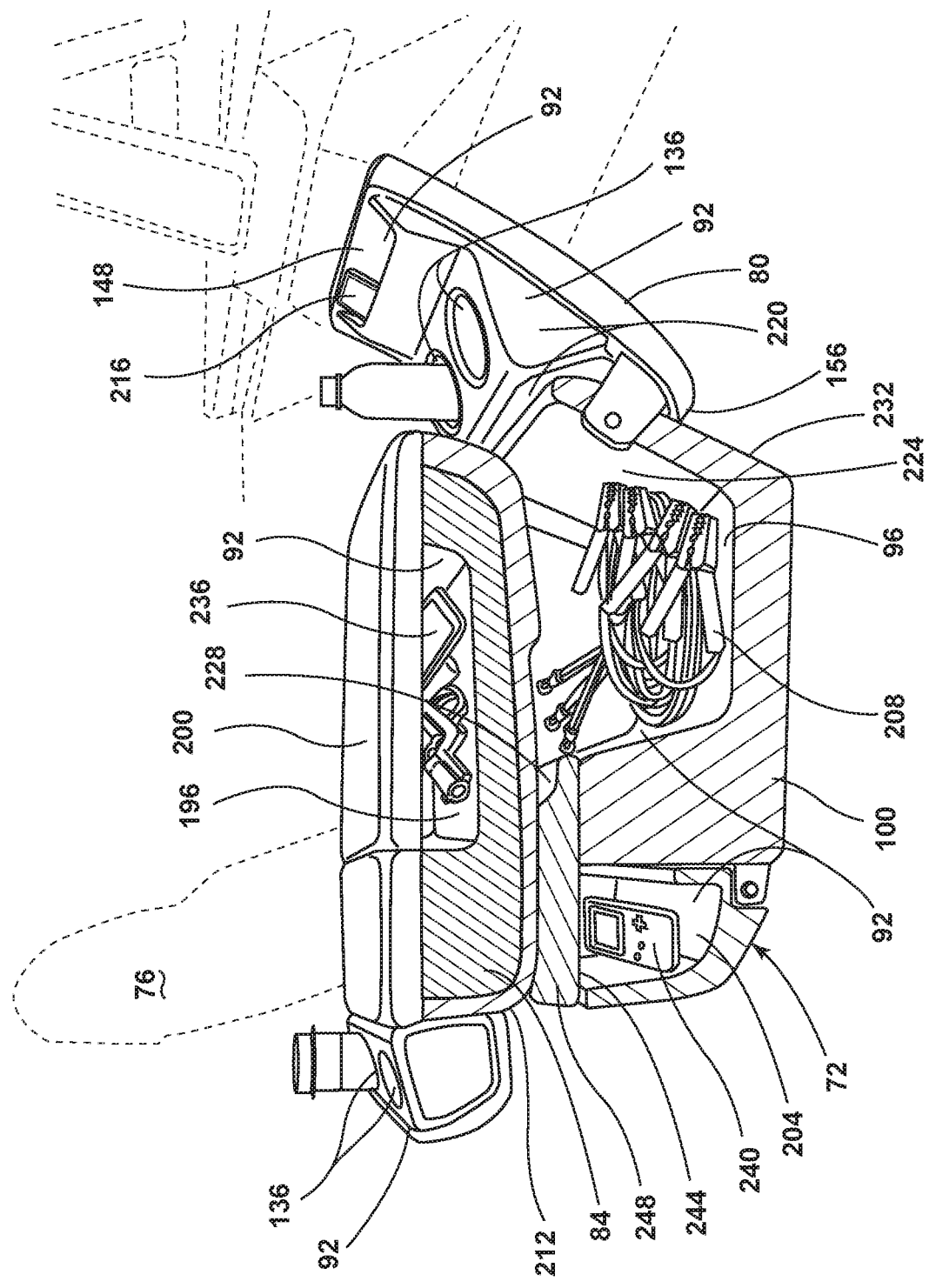
FIG. 14 is a side view of the center seating assembly, illustrating the storage areas, according to one embodiment.

Referring to FIG. 14, the center seating assembly 72 is shown in a stowed position where the seatback 84 is pivoted toward the seat 80 to a forward-dumped position while the seat 80, which houses one of the storage areas 92, is in the extended position. The center seating assembly 72 in the depicted configuration is equipped with a multitude of storage solutions. In some examples, the center seating assembly 72 may include at least three independently accessible storage areas 92. For example, the center seating assembly 72 may be equipped with five independently accessible storage areas 92. In various examples, the center seating assembly 72 may be provided with at least two storage areas 92 that are accessible by users positioned rearward of the center seating assembly 72. The storage solutions depicted include, but are not limited to, the storage bin 96, the cup holders 136, the media storage area 148, the seatback storage area 196, and a rearward compartment 204. The storage bin 96 may be accessible when the seat 80 is in the extended position and the seatback is in the forward-dumped position. The storage bin 96 may be utilized to store large items such as jumper cables 208. The cup holders 136 may be located in the storage area 92 that is positioned on an underside of the seat 80. Additionally or alternatively, the cup holders 136 may be positioned along a bottom edge 212 of the seatback 84 such that when the seatback 84 is in the forward-dumped position rearward passengers may utilize the cup holders 136. The cup holders 136 that are positioned on the bottom edge 212 of the seatback 84 may be deployably coupled to the bottom edge 212 in a manner that does not interfere with the rotation of the seatback 84 as the center seating assembly 72 is placed in a use position. In an alternative example, the cup holders 136 that are positioned along the bottom edge 212 of the seatback 84 may be fixedly coupled to the seatback 84 and configured to permit rotational motion of the seatback 84 relative to the seat 80. Said another way, the cup holders 136 that are coupled to the bottom edge 212 may be integrally formed in a rigid fashion to the seatback 84 in a manner that does not interfere with normal operation of the center seating assembly 72.

Referring again to FIG. 14, the media storage area 148 may be positioned in the underside of the seat 80 and proximal to the cup holders 136 that are similarly positioned. The media storage area 148 may be utilized, for example, to store a user's mobile device 216. The structure on the underside of the seat 80 that defines the cup holders 136 may provide support to the seat 80 when the seat 80 is in at least one of the extended and the retracted positions. For example, a support surface 220 of the cup holders 136 that are positioned on the underside of the seat 80 may directly abut a forward wall 224 of the storage bin 96 when the seat 80 is in the retracted position such that the support surface 220 may transfer at least some of a load of an occupant seated in the center seating assembly 72 to the support structure 100 that defines the storage bin 96. When an occupant is seated in the seat 80, the seat 80 may additionally or alternatively be supported by a support lip 228 that is provided in at least a portion of the support structure 100. When the seat 80 is in the extended position depicted, the support surface 220 of the cup holders 136 may abut an exterior wall 232 of the support structure 100 such that items stored in the cup holders 136 and/or media storage area 148 may be at least partially supported by a transfer of the load from the seat 80 to the support structure 100.

Referring further to FIG. 14, in some examples, the forward extreme 156 of the seat 80 may directly abut the exterior wall 232 when the seat 80 is in the extended position such that support is provided and load is generally transferred from the seat 80 to the support structure 100. The seatback storage area 196 may be covered by the seatback storage lid 200. The seatback storage area 196 may be utilized, for example, to store quick-access items such as a personal safety device 236. The rearward compartment 204 may be accessible solely to rear seat passengers and may be utilized to store any number of items. For example, an electronic entertainment device 240 may be stored in the rearward compartment 204. The rearward compartment 204 may be pivotably coupled to the support structure 100. An upper wall 244 of the rearward compartment 204 may be defined by at least a portion of the seat 80. For example, a seat panel 248 may be provided between the seatback 84 and the support structure 100. The seat panel 248 may have the support lip 228 integrally formed therewith. Additionally or alternatively, the seat panel 248 may be at least partially cushioned on an upper surface such that an occupant of the center seating assembly 72 is provided with a substantially continuous cushioned surface to sit upon when the center seating assembly 72 is in the use position.

Figure 15:
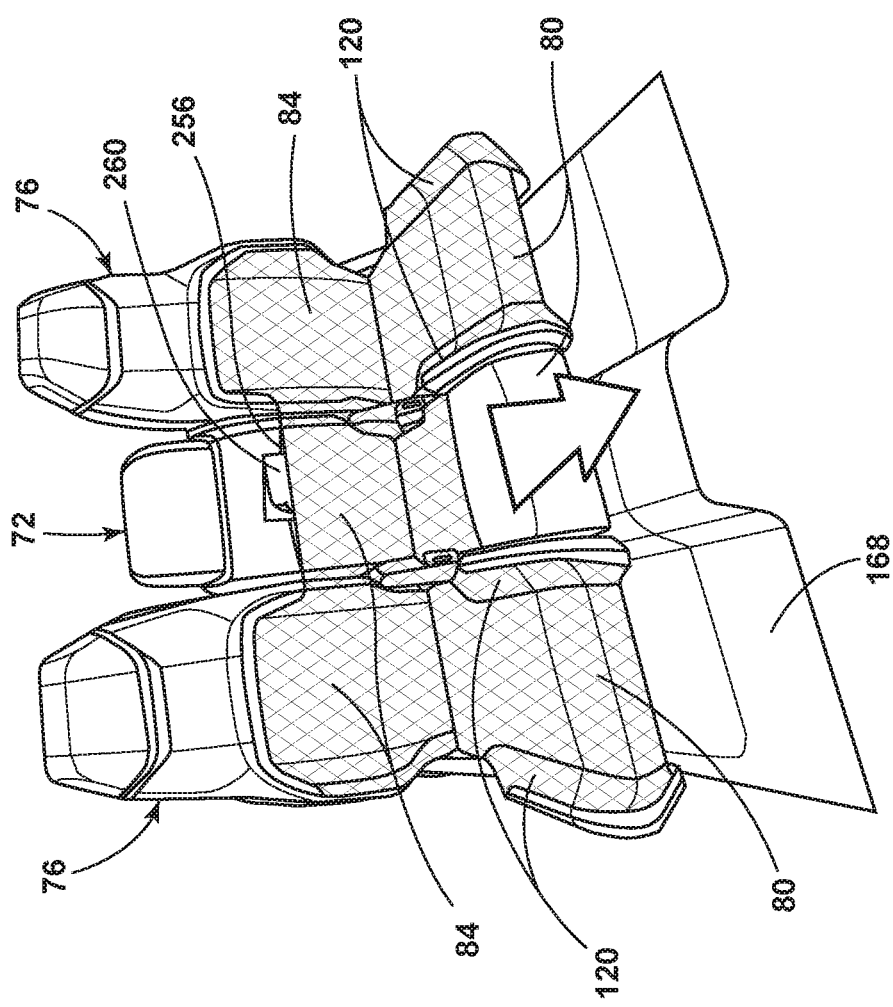
FIG. 15 is a front view of the vehicle seating arrangement, illustrating the seat in a longitudinally retracted position, according to another embodiment.
Figure 16:
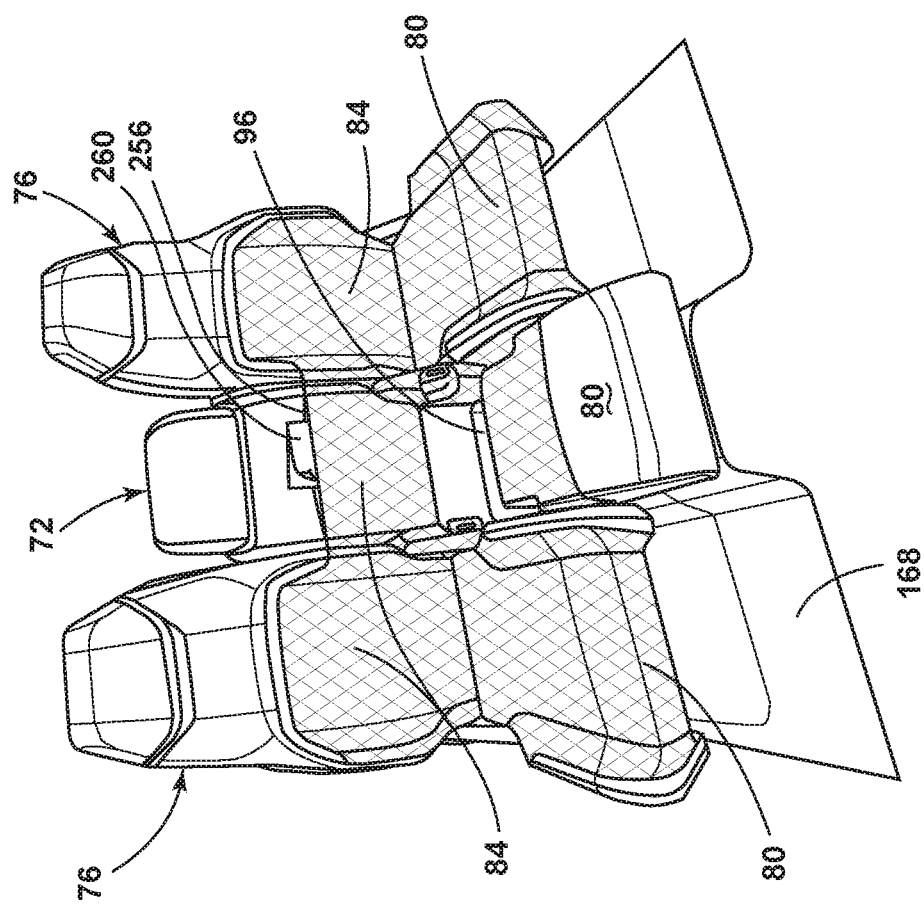
FIG. 16 is a front view of the vehicle seating arrangement, illustrating the seat in a longitudinally extended position.
Figure 17:
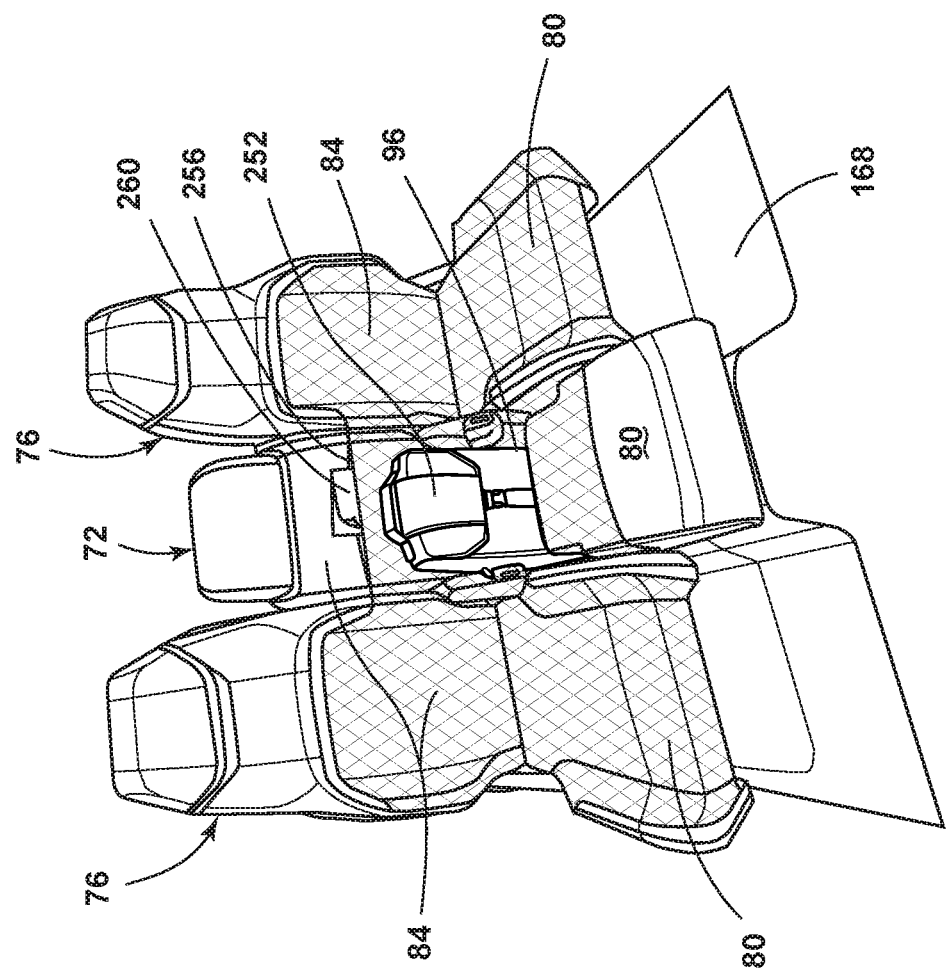
FIG. 17 is a front view of the vehicle seating arrangement, illustrating a cargo item stored in a storage bin while the seat is in the longitudinally extended position.

Referring now to FIGS. 15-17, the seat 80 of the center seating assembly 72 may be longitudinally extendable relative to the seatback 84 in a vehicle-forward direction. Accordingly, the seat 80 may be operable between a longitudinally retracted position (FIG. 15) and a longitudinally extended position (FIG. 16). When the seat 80 is in the longitudinally retracted position, an occupant may utilize the center seating assembly 72 in a conventional manner. Alternatively, when the seat 80 of the center seating assembly 72 is placed in the longitudinally extended position, then a user, such as the occupants of the outboard seating assemblies 76, may utilize the storage bin 96 that is positioned below the seat 80. While some examples may utilize the support structure 100 (FIG. 14) depicted and described in the preceding figures, it is contemplated that alternative examples, such as those depicted in FIGS. 15-17, may reveal a direct pass-through from the seat 80 to the floor 168 of the vehicle 40 (FIG. 1). Said another way, when a user actuates the seat 80 from the longitudinally retracted position to the longitudinally extended position, then the user may be presented with a carpeted surface of the floor 168 upon which items may be stored. In such an example, the seat bolsters 120 of the outboard seating assemblies 76 may act as lateral walls to the storage bin 96. Upon placing the seat 80 in the longitudinally extended position to reveal the storage bin 96, a user may place one or more items in the revealed storage bin 96, such as a backpack 252 or work bag. In various examples, the seatback 84 of at least one of the center seating assemblies 72 and the outboard seating assemblies 76 may be provided with a pocket 256 that is positioned on a vehicle-forward surface of the seatback 84. The pocket 256 may be utilized to store a variety of items, such as one or more documents 260 that the user may desire to have quick access to. For example, the documents 260 may be vehicle registration, maps, shopping lists, proof of insurance, and the like.

Figure 18:
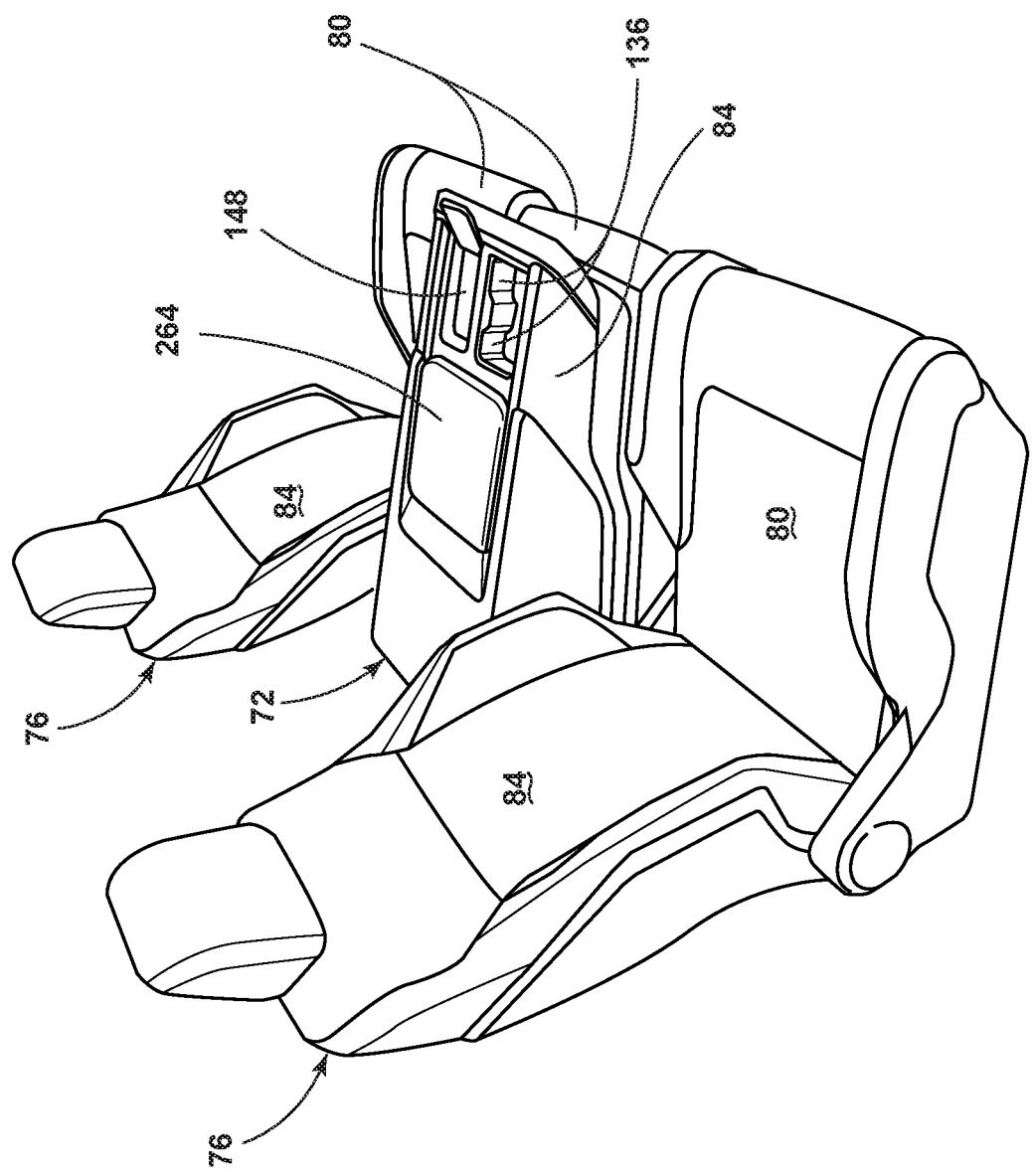
FIG. 18 is a side perspective view of the vehicle seating arrangement, illustrating the center seating assembly in the forward-dumped position, according to another embodiment.

Referring to FIG. 18, the center seating assembly 72 is shown in the forward-dumped position, according to one example. A rearward surface of the seatback 84 is equipped with the one or more cup holders 136 and the media storage area 148. The rearward surface of the seatback 84 is further equipped with a pivotable panel 264 that is pivotable between a rearward-pivoted position and a forward-pivoted position. The pivotable panel 264, as shown in FIG. 18, is in the rearward-pivoted position. In some examples, the pivotable panel 264 may be padded on one or more sides such that the pivotable panel 264 may be utilized as a cushioned armrest regardless of the position of the pivotable panel 264. Additionally or alternatively, the pivotable panel 264 may be coupled to the seatback 84 in a slidable manner such that the pivotable panel 264 is slidably actuated between the rearward-pivoted position and the forward-pivoted position.

Figure 19A:
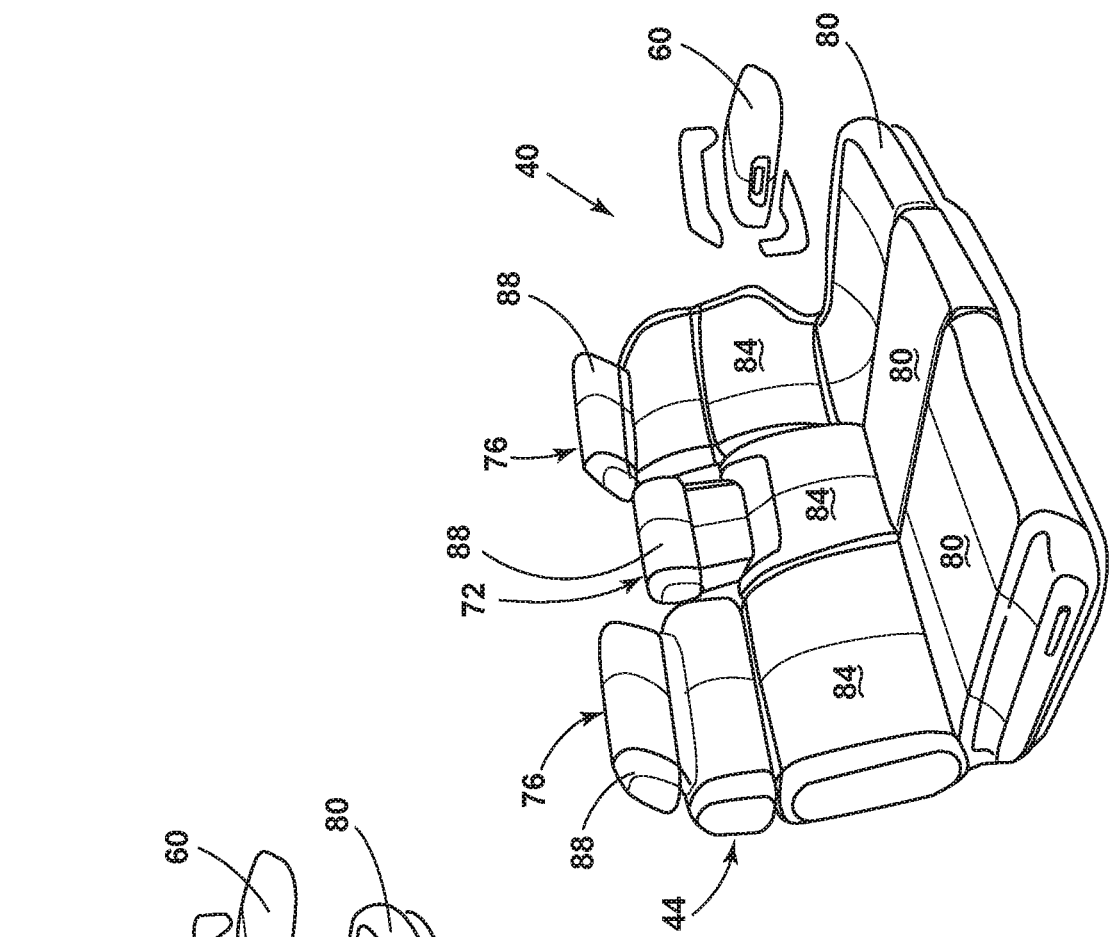
FIG. 19A is a side perspective view of the vehicle seating arrangement, illustrating headrest in a lowered position, according to one embodiment.
Figure 19B:
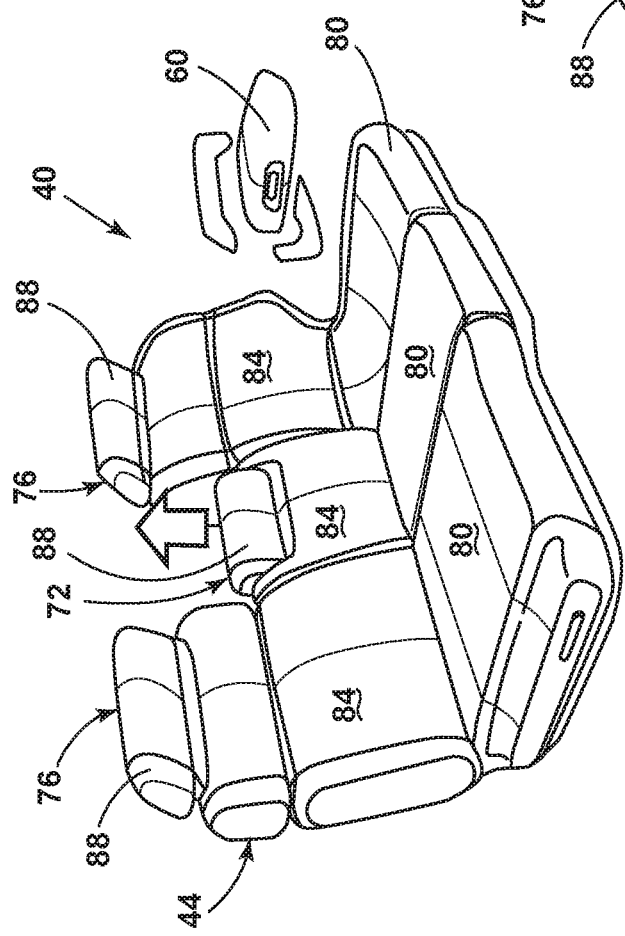
FIG. 19B is a side perspective view of the vehicle seating arrangement, illustrating the headrest in a raised position.

Referring to FIGS. 19A and 19B, the first row of seats 44 is depicted with the steering wheel 60 positioned in front of one of the outboard seating assemblies 76. The headrest 88 on the center seating assembly 72 may be actuated between a lowered position (FIG. 19A) and a raised position (FIG. 19B). Accordingly, the headrest 88 may be adjusted for occupants of various heights or the headrest 88 may be actuated to the lowered position when the center seating assembly 72 is unoccupied such that the sight of the driver while operating the vehicle 40 is not impeded.

Figure 20:
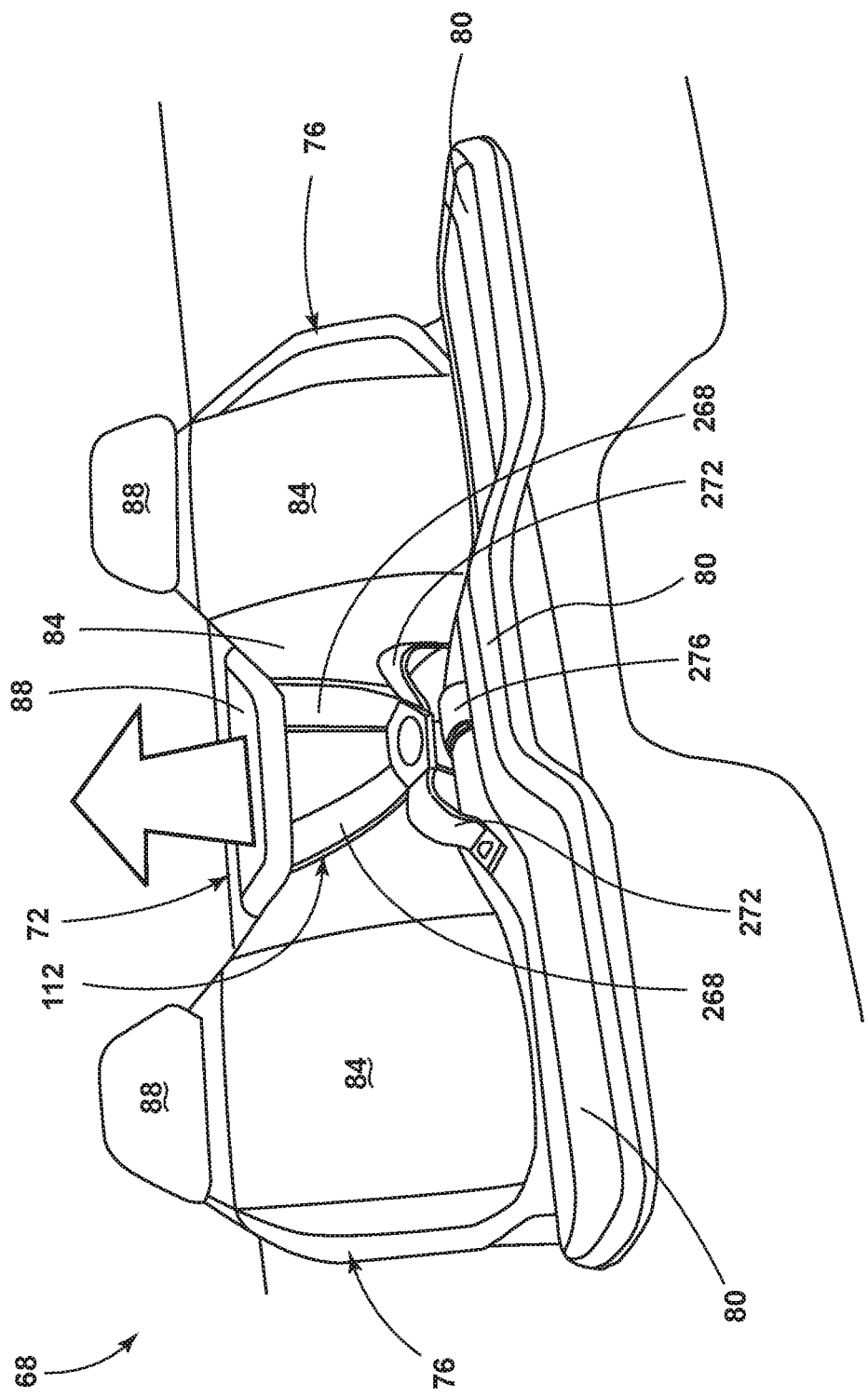
FIG. 20 is a front view of the vehicle seating arrangement, illustrating safety restraints, according to one embodiment.

Referring now to FIG. 20, the vehicle seating arrangement 68 includes the center seating assembly 72 and the outboard seating assemblies 76. The headrest 88 is actuatable between the lowered position and the raised position. As the headrest 88 is actuated between the lowered position and the raised position, the safety restraints 112 may travel with the headrest 88 to accommodate various sizes of occupants. The safety restraints 112 depicted may be referred to as a five-point harness that may be utilized, for example, to safely secure a child in the center seating assembly 72. In various examples, the five-point harness may be at least partially removed to better accommodate passengers that are larger than a child. For example, the five-point harness may include first and second shoulder portions 268, first and second hip portions 272, and a center lap portion 276. To transition the five-point harness from use for a child occupant to a configuration that is more appropriate for passengers that are larger than a child, the first and second shoulder portions 268 and the center lap portion 276 may be retracted into the seatback 84 and the seat 80, respectively, such that the first and second hip portions 272 remain as a lap safety restraint. In another example, one of the first and second shoulder portions 268 and one of the first and second hip portions 272 may be retracted within the seatback 84 and the seat 80, respectively. Next, the center lap portion 276 may be retracted into the seat 80 such that a diagonal safety restraint remains for the occupant. It is contemplated that components of the five-point harness may alternatively be fully removed to obtain the various configurations of the safety restraints 112 rather than being retracted into the seat 80 or the seatback 84.

Figure 21:
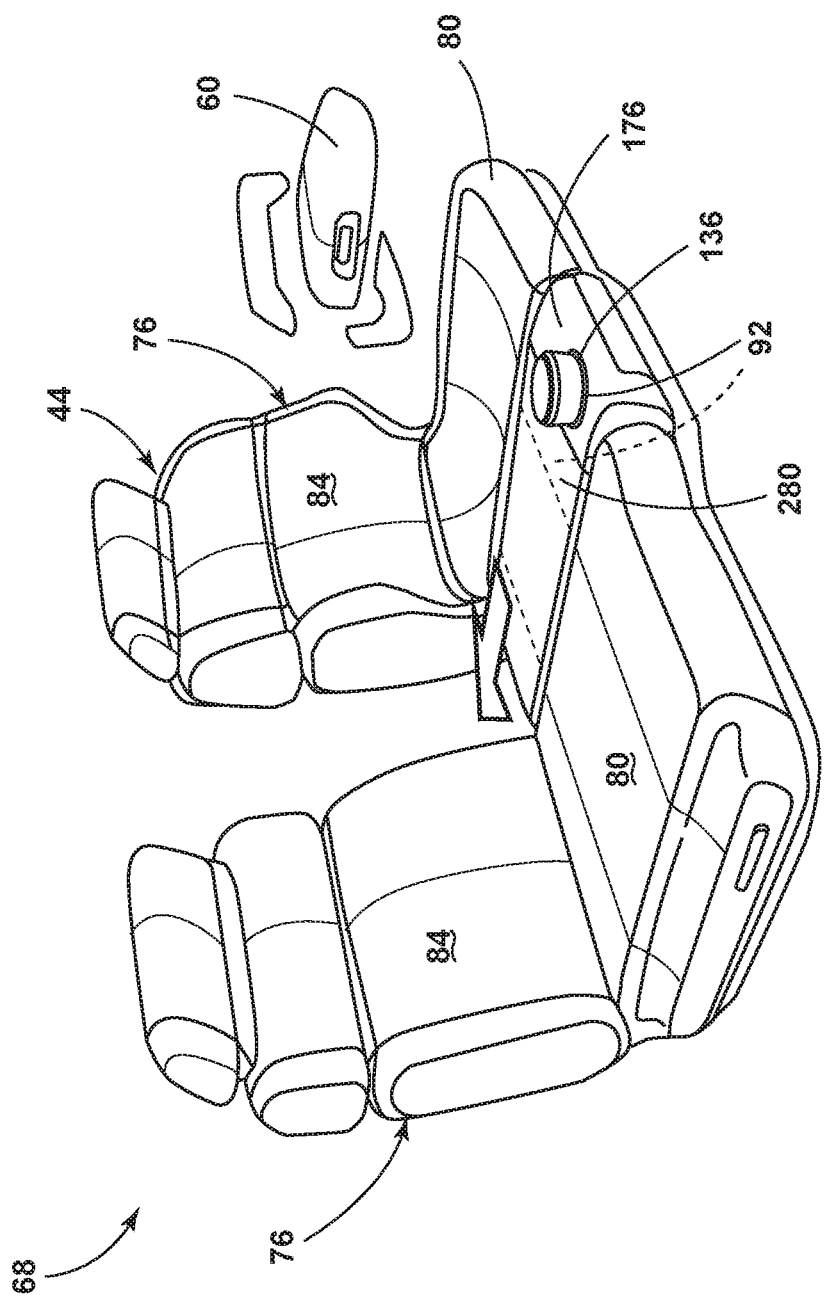
FIG. 21 is a side perspective view of the vehicle seating arrangement, illustrating a slidable portion.

Referring now to FIG. 21, the outboard seating assemblies 76 are depicted with the center console 176 in another example. In the depicted example, the center console 176 may be substantially planar with a top surface of the seats 80 of the outboard seating assemblies 76. The center console 176 is equipped with the one or more cup holders 136 and a slidable portion 280. A top surface of the slidable portion 280 may be cushioned to increase potential comfort of occupants of the vehicle seating arrangement 68. The slidable portion 280 may be actuatable in a rearward direction from a closed position (FIG. 21) to an open position. When in the open position, the slidable portion 280 may reveal the one or more storage areas 92 or may provide passengers that are seated rearward of the first row of seats 44 with a surface to store items upon or a footrest.

Figure 22:
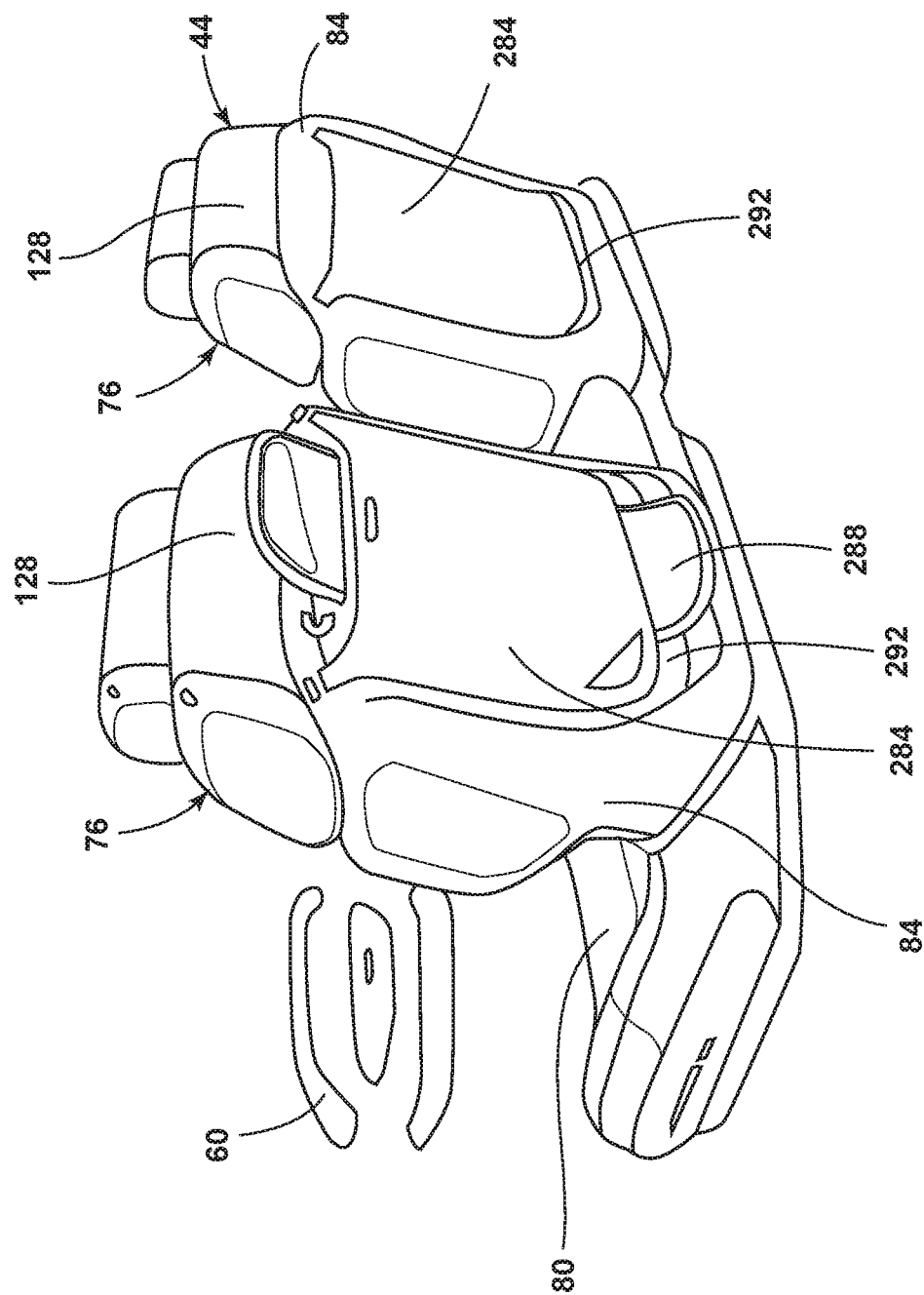
FIG. 22 is rear perspective view of the outboard seating assemblies, illustrating a storage sleeve.
Figure 23:
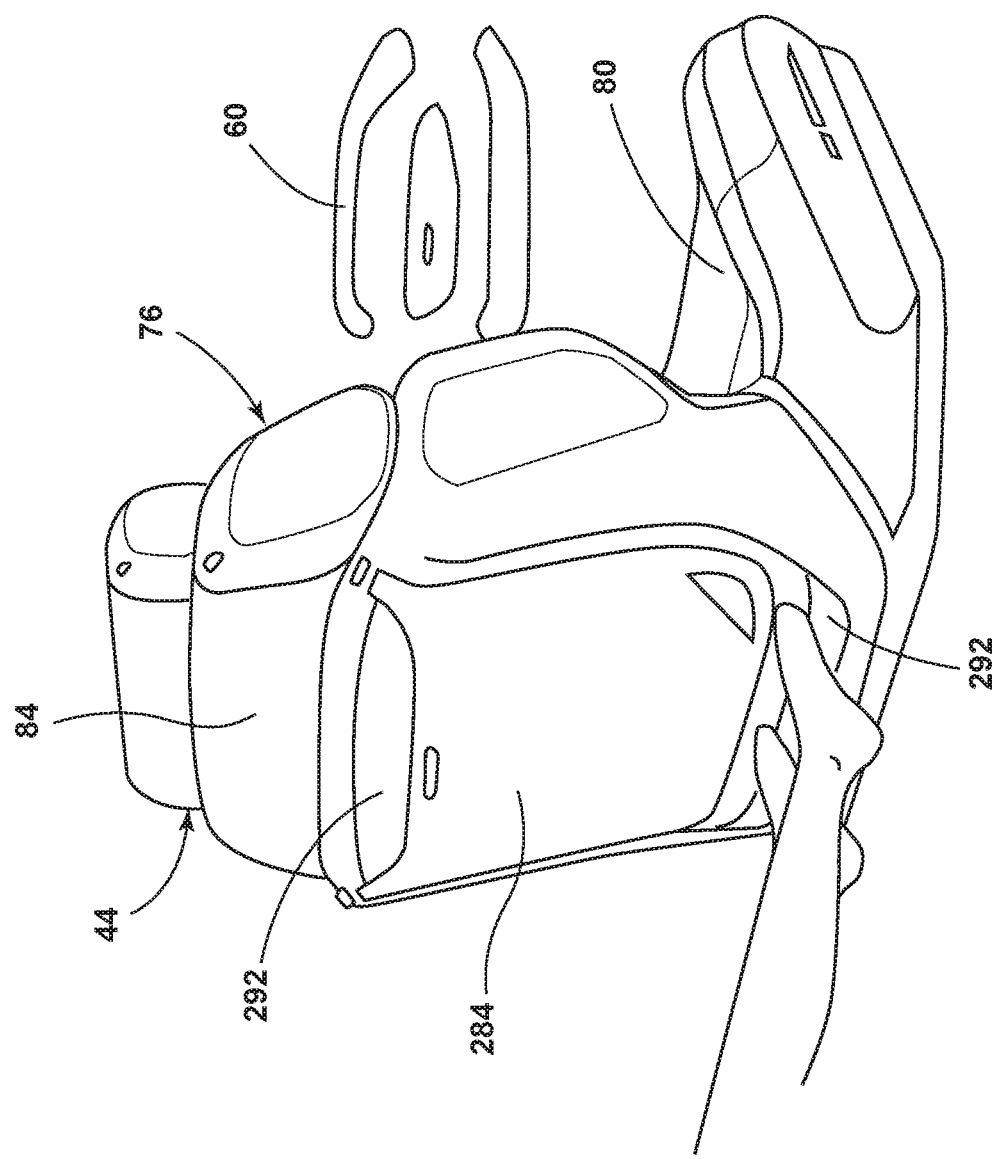
FIG. 23 is a rear perspective view of the outboard seating assembly, illustrating a recessed region.

Referring now to FIGS. 22 and 23, the rearward side 128 of the first row of seats 44 may include additional functionality. For example, the rearward side 128 of the seatbacks 84 may include a large storage sleeve 284 that is open at a top end and a bottom end such that large items may be stored between the storage sleeve 284 and the rearward side 128 of the seatback 84. For example, the large items may include a skateboard 288 or other large items that a user desires to retain. The storage sleeve 284 is operably coupled to the seatback 84. The seatback 84 may include a recessed region 292 in the rearward side 128 of the seatback 84 to accommodate storage of large items in the storage sleeve 284. When items are not being stored within the storage sleeve 284, the recessed region 292 may be utilized by a rearward passenger as a footrest. In some examples, the storage sleeve 284 may be closed on a bottom end such that the recessed region 292 may remain accessible to the rearward passenger as a footrest regardless of whether items are stored in the storage sleeve 284.

Figure 24:
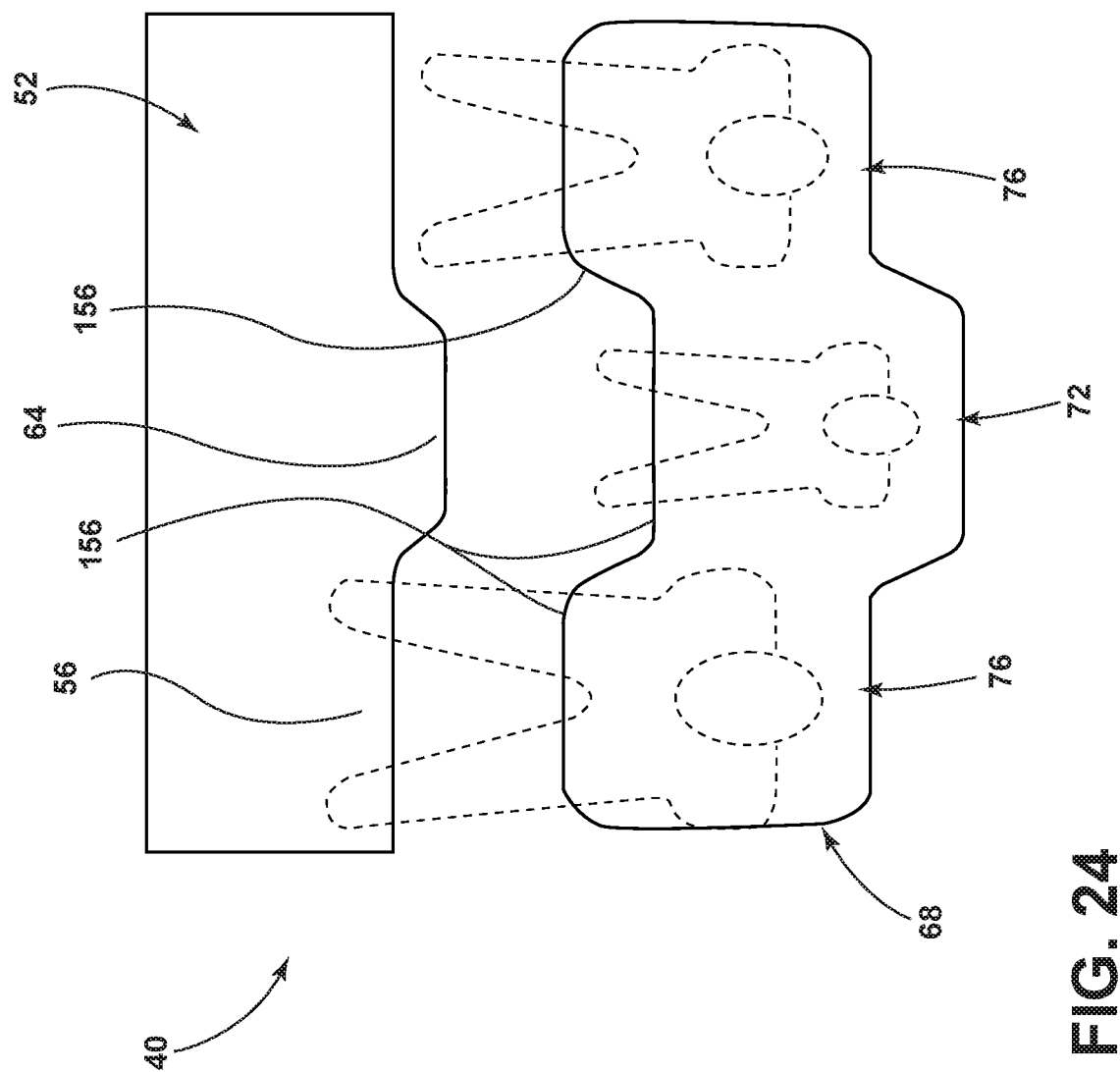
FIG. 24 is a top plan view of the vehicle seating arrangement and a dashboard assembly, illustrating a profile of each.

Referring to FIG. 24, the vehicle seating arrangement 68 generally follows a profile of the dashboard assembly 52, the instrument panel 56 and/or the entertainment interface 64 of the vehicle 40. For example, the forward extreme 156 of the center seating assembly 72 (first seating assembly) may be displaced rearward of the forward extreme 156 of at least one of the outboard seating assemblies 76 (second and third seating assemblies). Accordingly, passengers that are seated in the center seating assembly 72 are afforded greater leg room than if the seating arrangement 68 were to provide a linear forward extreme 156 of the vehicle seating arrangement 68. Additionally, by providing the center seating assembly 72 at a higher and more rearward H-point than the outboard seating assembly 76 additional lateral space may be provided to the occupants of the vehicle seating arrangement 68. For example, the occupants of the outboard seating assemblies 76 may avoid having their shoulders contact the shoulders of an occupant of the center seating assembly 72 as the occupant of the center seating assembly 72 is seated longitudinally more rearward in the vehicle 40 than the occupants of the outboard seating assemblies 76.

Figure 25:
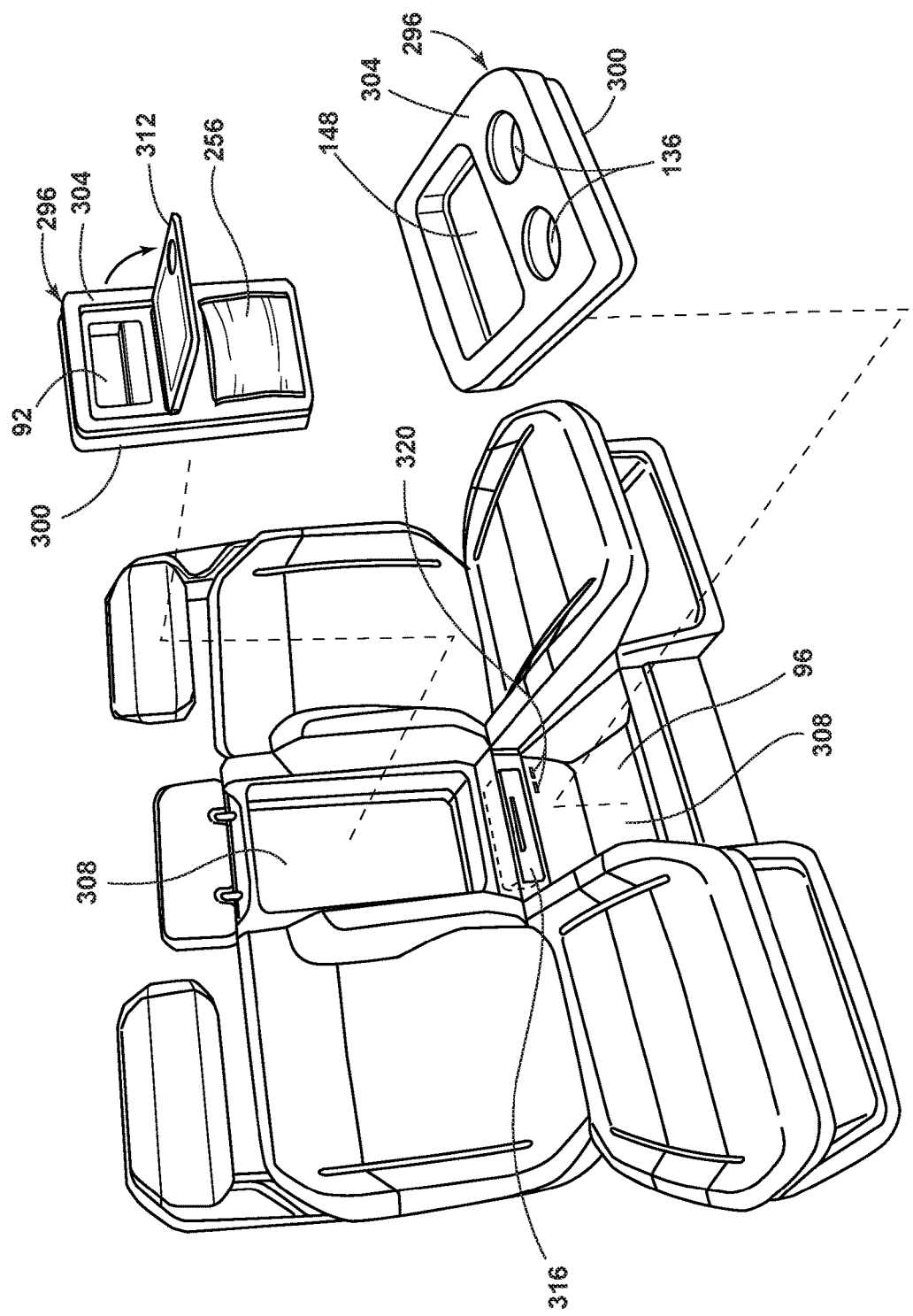
FIG. 25 is a front perspective view of the vehicle seating arrangement, illustrating cushions that are removable, according to one embodiment.

Referring now to FIG. 25, a vehicle seating assembly, such as the center seating assembly 72 and/or the outboard seating assemblies 76, may include one or more cushions 296 that are removable from a component of the vehicle seating assembly (e.g., the seat 80, a seat frame, a seat carrier, the seatback 84, a seatback frame, a seatback carrier, and/or combinations thereof) The cushions 296 include a first side 300 and a second side 304. The first side 300 may be cushioned while the second side 304 is provided with at least one of the storage areas 92. The first and second sides 300, 304 may be opposite one another. Said another way, transitioning the cushions 296 from the first side 300 to the second side 304 may be accomplished, for example, by at least partially removing the cushions 296 from a cavity 308 that the cushions 296 fit within. In some examples, the cushions 296 are transitioned from the first side 300 to the second side 304 by fully removing the cushions 296 from the cavity 308, then rotating the cushion 296 about one-hundred-eighty degrees, and replacing the cushion 296 within the cavity 308. After transitioning the cushion 296 from the first side 300 to the second side 304, the at least one storage area 92 is presented to a user. In some examples, when the cushion 296 is oriented with the second side 304 presented to the user, a profile of the vehicle seating assembly may remain the same as when the cushion 296 is oriented with the first side 300 presented to the user. Accordingly, the profile of the vehicle seating assembly may remain the same regardless of whether the first or second sides 300, 304 are presented to the user. In various examples, the cushions 296 may be positioned in at least one of the seat 80 and the seatback 84. In some examples, the cushions 296 are positioned in both the seat 80 and the seatback 84. The one or more storage areas 92 may include, but are not limited to, the storage bin 96, the at least one cup holders 136, the media storage area 148, the pocket 256, and/or combinations thereof. It is contemplated that the cushions 296 may be entirely removed from the associated cavity 308 such that the cavity 308 may be utilized to store items, similar to the storage bin 96. In some examples, items may be stored in the cavity 308 and the cushion 296 may then be placed in the cavity 308 to provide a safe, secure, and hidden storage of the item. In various examples, the cushions 296 may be equipped with a work surface 312. The storage areas 92 may also include a retractable storage area 316 positioned in a structure of the seatback 84 at a location that abuts a rearward side of the seat 80. The storage bin 96 and/or cavity 308 may be illuminated by a light source 320.

Modifications of the disclosure will occur to those skilled in the art and to those who make or use the concepts disclosed herein. Therefore, it is understood that the embodiments shown in the drawings and described above are merely for illustrative purposes and not intended the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seat;
   a seatback; and
   at least three storage areas that are independently accessible, wherein the seat is pivotably coupled to a support structure rearward of a forward extreme, wherein cup holders operably coupled to an underside of the seat provide support to the seat when the seat is in an extended position, and wherein the cup holders operably coupled to the underside of the seat provide support to the seat when the seat is in a retracted position.

2. The vehicle seating assembly of claim 1, wherein the at least three independently accessible storage areas comprise five storage areas.

3. The vehicle seating assembly of claim 2, wherein at least two of the storage areas are accessible by users positioned rearward of the vehicle seating assembly.

4. The vehicle seating assembly of claim 1, wherein the at least three storage areas comprise a storage bin that is positioned directly below the seat when the seat is in the retracted position, and wherein the storage bin is accessible when the seat is in the extended position and the seatback is in a forward-dumped position.

5. The vehicle seating assembly of claim 4, further comprising:
   a floor-level storage compartment that is positioned in front of the storage bin, the storage bin and the floor-level storage compartment being separated by a cross-member.

6. A vehicle seating assembly, comprising:
   a seatback;
   a seat that is pivotably coupled to a support structure rearward of a forward extreme of said vehicle seating assembly, the seat being operable between a use position and a stowed position;
   a support structure that defines a first storage area, wherein the first storage area is positioned below the seat when the seat is in a use position, the first storage area being accessible when the seat is placed in the stowed position;
   a second storage area that is accessible independent of the position of the seat; and
   a third storage area pivotably coupled to the support structure proximal to a forward extreme of the support structure, the third storage area being operable between a stowed position and an extended position, the third storage area being accessible when the seat is in the stowed position; and wherein the third storage area at least partially supports the seat when the third storage area is in the stowed position and the seat is in the use position.

7. The vehicle seating assembly of claim 6, wherein the support structure further comprises:
   a cross-member that extends between sidewalls of the support structure and supports a load applied to the seat when the seat is in the use position.

8. The vehicle seating assembly of claim 7, wherein the cross-member serves as a front wall of the first storage area.

9. The vehicle seating assembly of claim 8, wherein the cross-member serves as a rear wall of the second storage area.

10. The vehicle seating assembly of claim 6, wherein at least one of the first storage area and the second storage area comprises a forward lip that extends upwardly from a bottom surface of the associated storage area.

11. The vehicle seating assembly of claim 6, wherein the third storage area comprises one or more cup holders that are accessible when the third storage area is in the extended position.

12. The vehicle seating assembly of claim 6, wherein the seat comprises a fold-out element provided in an underside of the seat.

13. The vehicle seating assembly of claim 6, wherein the second storage area is positioned below the first storage area.

14. The vehicle seating assembly of claim 6, wherein the second storage area is positioned in front of the first storage area.

15. A vehicle, comprising:
   a first row of seats;
   a second row of seats positioned rearward of the first row of seats; and
   a vehicle seating assembly positioned in the first row of seats, the vehicle seating assembly comprising:
      a seat;
      a seatback pivotably coupled to the seat;
      a support structure that is positioned below the seat, the support structure defining a first storage area and a second storage area, the first and second storage areas being independently accessible and separated by the support structure, with the first storage area being configured for access by a user that is seated in the first row of seats and adjacent to the vehicle seating assembly and the second storage area being configured for access by a user that is seated in the second row of seats, and wherein the seat is pivotably coupled to the support structure proximate to a forward extreme of the support structure, the seat being operable between a retracted position and an extended position; and a third storage area positioned in an underside of the seat.

16. The vehicle of claim 15, further comprising:

a fourth storage area positioned on the seatback, the fourth storage area being accessible when the seatback is in a forward-dumped position.

17. The vehicle of claim 16, wherein the fourth storage area is positioned in a rearward side of the seatback.

18. The vehicle of claim 16, wherein the fourth storage area is positioned in a rearward side of a headrest of the seatback.

19. The vehicle of claim 16, wherein the fourth storage area is positioned along a lower edge of the seatback.

* * * * *